(12) United States Patent
Shimizu

(10) Patent No.: US 7,253,821 B2
(45) Date of Patent: Aug. 7, 2007

(54) SPECIAL EFFECT DEVICE, ADDRESS SIGNAL GENERATING DEVICE, ADDRESS SIGNAL GENERATING METHOD AND ADDRESS SIGNAL GENERATING PROGRAM

(75) Inventor: Hideyuki Shimizu, Kanagawa (JP)

(73) Assignee: Sony Corporation, Tokyo (JP)

( * ) Notice: Subject to any disclaimer, the term of this patent is extended or adjusted under 35 U.S.C. 154(b) by 205 days.

(21) Appl. No.: 10/816,707

(22) Filed: Apr. 2, 2004

(65) Prior Publication Data

US 2004/0264914 A1 Dec. 30, 2004

(30) Foreign Application Priority Data

Apr. 4, 2003 (JP) ............................. 2003-102349

(51) Int. Cl.
*G09G 5/00* (2006.01)
(52) U.S. Cl. ...................... 345/619; 345/582; 345/649; 348/578; 348/583; 348/594
(58) Field of Classification Search ..................... None
See application file for complete search history.

(56) References Cited

U.S. PATENT DOCUMENTS 5,521,648 A * 5/1996 Shiraishi et al. ............ 348/580
5,847,712 A * 12/1998 Salesin et al. .............. 345/582

FOREIGN PATENT DOCUMENTS

JP 2003-60985 2/2003

OTHER PUBLICATIONS

Dreamsuite by Auto FX Software, Oct. 2002, http://web.archive.org/web/20021011052058/http://www.autofx.com/dreamsuite/effect_pages/deckle.html.*

* cited by examiner

*Primary Examiner*—Kee M. Tung
*Assistant Examiner*—Jwalant Amin
(74) *Attorney, Agent, or Firm*—Frommer Lawrence & Haug LLP; William S. Frommer; Thomas F. Presson

(57) ABSTRACT

A novel special picture effect is to be achieved by a read address control system. To this ends, a special effect device includes an address signal generating unit 3 for generating a readout address signal for picture signals stored in a frame buffer 2 so that such a special effect is achieved in which a picture corresponding to the picture signals stored in said frame buffer is rotationally moved about an optional point, provided to the outer rim of a display area at the time of display, as the center of rotation, so as to disappear to outside the display area.

4 Claims, 17 Drawing Sheets

FIG. 3
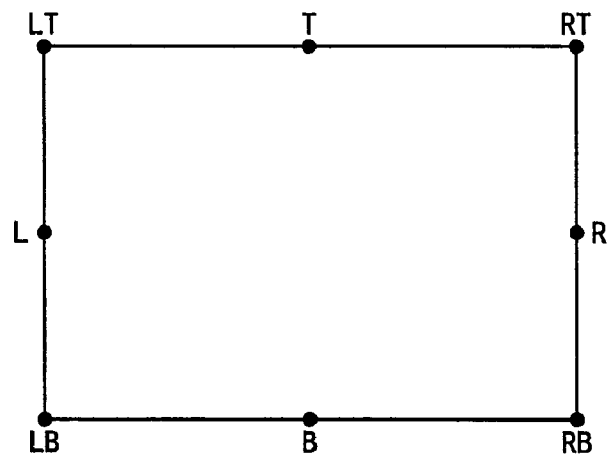
FIG. 4
| PARAMETER NAME | MEANING | RANGE | DEFAULT |
|---|---|---|---|
| lCenterType | CENTER OF ROTATION | LeftBottom<br>RightBottom<br>LeftTop<br>RightTop<br>Bottom<br>Top<br>Left<br>Right | ○ |
| lRotateType | DIRECTION OF ROTATION | Clockwise<br>Counterclockwise | ○ |
| trans | AMOUNT OF MOVEMENT | 0to1 | |
FIG. 5

FIG.10
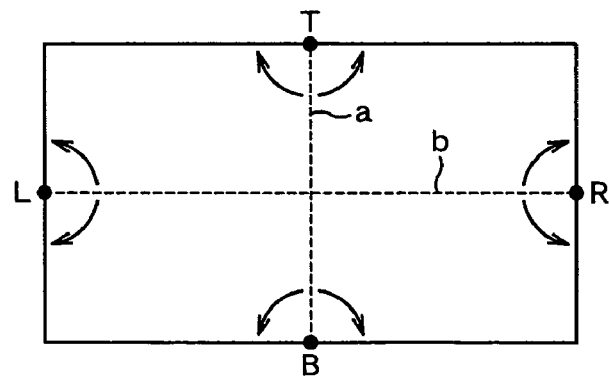
FIG.11
| PARAMETER NAME | MEANING | RANGE | DEFAULT |
|---|---|---|---|
| ICenterType | CENTER OF ROTATION | Bottom<br>Top<br>Left<br>Right | ○ |
| trans | AMOUNT OF MOVEMENT | 0to1 | |
FIG.12

| PARAMETER NAME | MEANING | RANGE | DEFAULT |
|---|---|---|---|
| IBarnType | TYPE | Vertical Horizonal Cross | ○ |
| fixSlant | TILT | -45.0to45.0 | 0.0 |
| trans | AMOUNT OF MOVEMENT | 0to1 | |

FIG.24
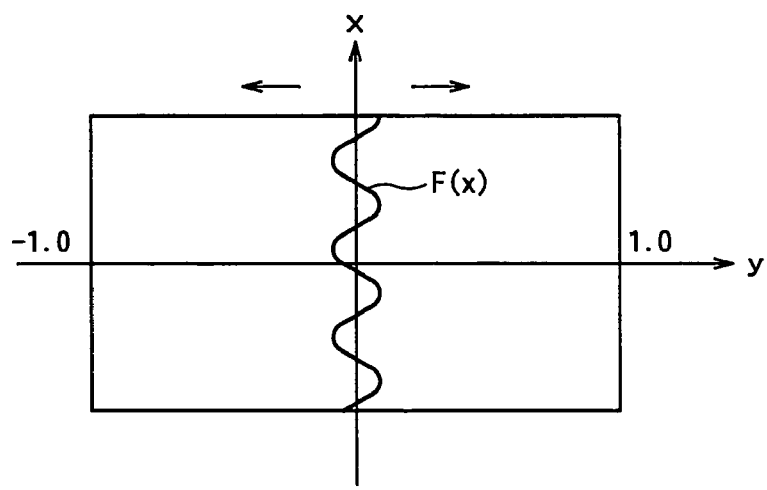
FIG.25
| PARAMETER NAME | MEANING | RANGE | DEFAULT |
|---|---|---|---|
| fixAmplitude | MAXIMUM AMPLITUDE | -1.0 to 1.0 | 0.5 |
| fixFrequency | FREQUENCY | 0.0 to 1.0 | 0.2 |
| fixPhase | PHASE | -4.0 to 4.0 | 0.0 |
| IInterpolationType | INTERPOLATION TYPE | Near Linear Lagurange | ○ |
| fixRotate | AMOUNT OF ROTATION | -720.0 to 720.0 | 0.0 |
| trans | AMOUNT OF MOVEMENT | 0 to 1 | |
FIG.26

Near

Linear

Lagrange

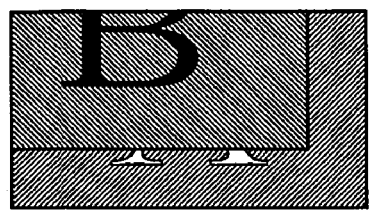
FIG.33
| PARAMETER NAME | MEANING | RANGE | DEFAULT |
|---|---|---|---|
| lCount | NUMBER OF REBOUNDING EVENTS | 1to10 | 3 |
| fixPosition | POSITION OF DESCENT | -1.0to1.0 | 0.0 |
| fixRebound | REPULSIVE FORCE | 0.0to1.0 | 0.5 |
| trans | AMOUNT OF MOVEMENT | 0to1 | |
FIG.34
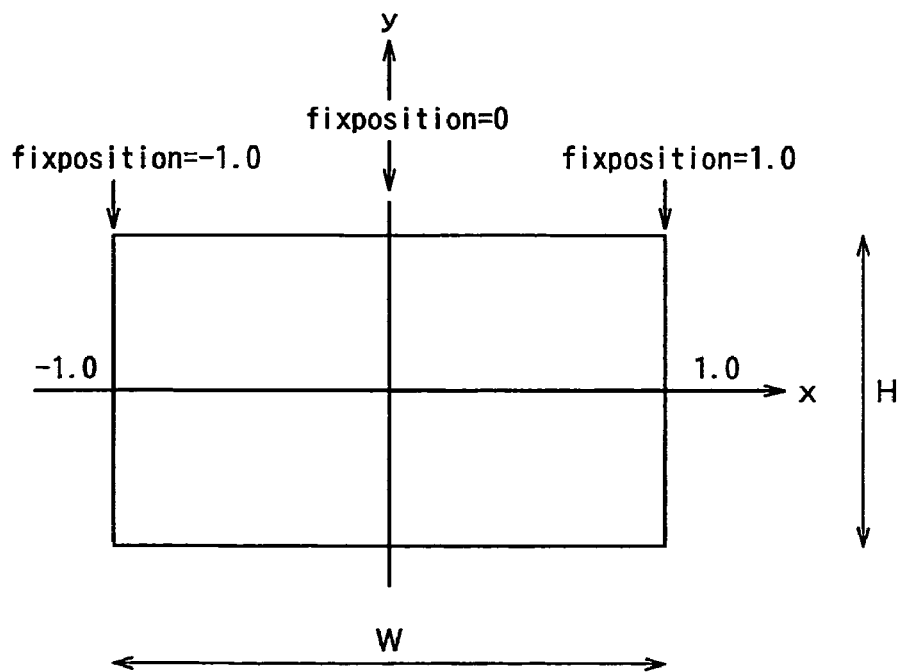
FIG.35

SPECIAL EFFECT DEVICE, ADDRESS SIGNAL GENERATING DEVICE, ADDRESS SIGNAL GENERATING METHOD AND ADDRESS SIGNAL GENERATING PROGRAM

BACKGROUND OF THE INVENTION

1. Field of the invention

This invention relates to a special picture effect and, more particularly, to a special effect device for executing the special picture effect using a read address control system. This invention also relates to an address signal generating device, an address signal generating method and an address signal generating program.

This application claims priority of Japanese Patent Application No.2003-102349, filed in Japan on Apr. 4, 2003, the entirety of which is incorporated by reference herein.

2. Description of Related Art

A read address control system, in which a special picture effect is applied to picture signals stored in a frame memory by converting the readout address (address at the time of readout) and reading out the resulting address to apply a special picture effect to the picture signals, has been devised and put to practical use (see for example the Japanese Laying-Open Patent Publication H10-145672).

This read address control system has been devised and put to practical use only with respect to an extremely simple special picture effect, such as enlargement, contraction, rotation or displacement of pictures.

SUMMARY OF THE INVENTION

It is therefore an object of the present invention to provide a special effect device, an address signal generating device, an address signal generating method and an address signal generating program, which execute an entirely new special picture effect with the use of the aforementioned read address system.

In one aspect, the present invention provides a special effect device in which picture signals are read out from a frame buffer based on an address signal to impart a desired special effect to the picture signals read out from the frame buffer, in which the special effect device comprises address signal generating means for generating readout address signals of the picture signals stored in the frame buffer so that a special effect will be produced in which a picture corresponding to the picture signals stored in the frame buffer is rotationally moved about an optional point, provided to the outer rim of a display area at the time of display, as the center of rotation, so as to disappear to outside the display area.

In another aspect, the present invention provides an address signal generating device for generating an address signal for reading out picture signals from a frame buffer, in which the address signal generating device includes address signal generating means for generating a readout address signal of the picture signals stored in the frame buffer so that a picture corresponding to the picture signals stored in the frame buffer is rotationally moved about an optional point, provided to the outer rim of a display area at the time of display, as the center of rotation, so as to disappear to outside the display area.

In still another aspect, the present invention provides an address signal generating method for generating an address signal for reading out picture signals from a frame buffer, in which the address signal generating method includes an address signal generating step of generating a readout address signal of the picture signals stored in the frame buffer so that a picture corresponding to the picture signals stored in the frame buffer is rotationally moved about an optional point, provided to the outer rim of a display area at the time of display, as the center of rotation, so as to disappear to outside the display area.

In still another aspect, the present invention provides an address signal generating program for having a computer execute a process of generating an address signal for reading out picture signals from a frame buffer, in which the address signal generating program allows a computer to execute an address signal generating step of generating a readout address signal of the picture signals stored in the frame buffer so that a picture corresponding to the picture signals stored in the frame buffer is rotationally moved about an optional point, provided to the outer rim of a display area at the time of display, as the center of rotation, so as to disappear to outside the display area.

In still another aspect, the present invention provides a special effect device in which picture signals are read out from a frame buffer based on an address signal to impart a desired special effect to the picture signals read out from the frame buffer, in which the special effect device comprises address signal generating means for generating readout address signals of the picture signals stored in the frame buffer so that a special effect will be produced in which a picture corresponding to the picture signals stored in the frame buffer is fractionated into two partial pictures, having a linear boundary line, at the time of display, the partial pictures being rotationally moved in mutually opposite directions, each about one of two points of intersection of the boundary line with the outer rim of the display area, as the center of rotation, the partial pictures thus rotationally moved disappearing to outside the display area.

In still another aspect, the present invention provides an address signal generating device for generating an address signal for reading out picture signals from a frame buffer, in which the address signal generating device comprises address signal generating means for generating readout address signals of the picture signals stored in the frame buffer so that a special effect will be produced in which a picture corresponding to the picture signals stored in the frame buffer is fractionated into two partial pictures, having a linear boundary line, at the time of display, the partial pictures being rotationally moved in mutually opposite directions, each about one of two points of intersection of the boundary line with the outer rim of the display area, as the center of rotation, the partial pictures thus rotationally moved disappearing to outside the display area.

In still another aspect, the present invention provides an address signal generating method for generating an address signal for reading out picture signals from a frame buffer, in which the address signal generating method comprises an address signal generating step of generating readout address signals of the picture signals stored in the frame buffer so that a special effect will be produced in which a picture corresponding to the picture signals stored in the frame buffer is fractionated into two partial pictures, having a linear boundary line, at the time of display, the partial pictures being rotationally moved in mutually opposite directions, each about one of two points of intersection of the boundary line with the outer rim of the display area, as the center of rotation, the partial pictures thus rotationally moved disappearing to outside the display area.

In still another aspect, the present invention provides an address signal generating program for having a computer execute a process of generating an address signal for reading out picture signals from a frame buffer, in which the address signal generating program allows a computer to execute an address signal generating step of generating readout address signals of the picture signals stored in the frame buffer so that a special effect will be produced in which a picture corresponding to the picture signals stored in the frame buffer is fractionated into two partial pictures, having a linear boundary line, at the time of display, the partial pictures being rotationally moved in mutually opposite directions, each about one of two points of intersection of the boundary line with the outer rim of the display area, as the center of rotation, the partial pictures thus rotationally moved disappearing to outside the display area.

In still another aspect, the present invention provides a special effect device in which picture signals are read out from a frame buffer based on an address signal to impart a desired special effect to the picture signals read out from the frame buffer, in which the special effect device comprises address signal generating means for generating readout address signals of the picture signals stored in the frame buffer so that a special effect will be produced in which a picture corresponding to the picture signals stored in the frame buffer is fractionated into plural partial pictures, having a linear boundary line, at the time of display, each partial picture being translated so as to disappear to outside the display area.

In still another aspect, the present invention provides an address signal generating device for generating an address signal for reading out picture signals from a frame buffer, in which the address signal generating device includes address signal generating means for generating a readout address signal of the picture signals stored in the frame buffer so that a special effect will be produced in which a picture corresponding to the picture signals stored in the frame buffer is fractionated into plural partial pictures having a linear boundary line at the time of display and in which each partial picture is translated to disappear to outside the display area.

In still another aspect, the present invention provides an address signal generating method for generating an address signal for reading out picture signals from a frame buffer, in which the address signal generating device includes an address signal generating step of generating a readout address signal of the picture signals stored in the frame buffer so that a special effect will be produced in which a picture corresponding to the picture signals stored in the frame buffer is fractionated into plural partial pictures having a linear boundary line at the time of display and in which each partial picture is translated to disappear to outside the display area.

In still another aspect, the present invention provides an address signal generating program for having a computer execute a process of generating an address signal for reading out picture signals from a frame buffer, in which the address signal generating program allows a computer to execute an address signal generating step of generating a readout address signal of the picture signals stored in the frame buffer so that a special effect will be produced in which a picture corresponding to the picture signals stored in the frame buffer is fractionated into plural partial pictures having a linear boundary line at the time of display and in which each partial picture is translated to disappear to outside the display area.

In still another-aspect, the present invention provides a special effect device in which picture signals are read out from a frame buffer based on an address signal to impart a desired special effect to the picture signals read out from the frame buffer, The special effect device comprises address signal generating means for generating readout address signals of the picture signals stored in the frame buffer so that a special effect will be produced in which a picture corresponding to the picture signals stored in the frame buffer is fractionated into plural partial pictures, having a wavy boundary line, defined by a preset function, at the time of display, the partial pictures being translated so as to disappear to outside the display area.

In still another aspect, the present invention provides an address signal generating device for generating an address signal for reading out picture signals from a frame buffer, in which the address signal generating device includes address signal generating means for generating a readout address signal of the picture signals stored in the frame buffer so that a special effect will be produced in which a picture corresponding to the picture signals stored in the frame buffer is fractionated into plural partial pictures having a wavy boundary line as defined by a preset function at the time of display and in which each partial picture is translated to disappear to outside the display area.

In still another aspect, the present invention provides an address signal generating method for generating an address signal for reading out picture signals from a frame buffer, in which the address signal generating device includes an address signal generating step of generating a readout address signal of the picture signals stored in the frame buffer so that a special effect will be produced in which a picture corresponding to the picture signals stored in the frame buffer is fractionated into plural partial pictures having a wavy boundary line as defined by a preset function at the time of display and in which each partial picture is translated to disappear to outside the display area.

In still another aspect, the present invention provides an address signal generating program for having a computer execute a process of generating an address signal for reading out picture signals from a frame buffer, in which the address signal generating program allows a computer to execute an address signal generating step of generating a readout address signal of the picture signals stored in the frame buffer so that a special effect will be produced in which a picture corresponding to the picture signals stored in the frame buffer is fractionated into plural partial pictures having a wavy boundary line as defined by a preset function at the time of display and in which each partial picture is translated to disappear to outside the display area.

In still another aspect, the present invention provides a special effect device in which picture signals are read out from a frame buffer based on an address signal to impart a desired special effect to the picture signals read out from the frame buffer, in which the special effect device comprises address signal generating means for generating readout address signals of the picture signals stored in the frame buffer so that a special effect will be produced in which a picture corresponding to the picture signals stored in the frame buffer is presented as if it jumps from outside the display area at the time of display, and in which the picture is rebounded on an outer edge of the display area on the opposite side to the side where the picture is first presented, with the picture being moved to a mid portion of the display area after a preset number of the rebounding events.

In still another aspect, the present invention provides an address signal generating device for generating an address signal for reading out picture signals from a frame buffer, in which the address signal generating device includes address signal generating means for generating a readout address signal of the picture signals stored in the frame buffer so that a special effect will be produced in which a picture corresponding to picture signals stored in a frame buffer is presented during display as if it jumps from outside a display area, and in which the picture is rebounded at an outer edge of the display area on the opposite side to the side where the picture is first presented, the picture after a preset number of rebounding events being moved to a mid portion of the display area.

In still another aspect, the present invention provides an address signal generating method for generating an address signal for reading out picture signals from a frame buffer, in which the address signal generating method includes an address signal generating step of generating a readout address signal of the picture signals stored in the frame buffer so that a special effect will be produced in which a picture corresponding to picture signals stored in a frame buffer is presented during display as if it jumps from outside a display area, and in which the picture is rebounded at an outer edge of the display area on the opposite side to the side where the picture is first presented, the picture after a preset number of rebounding events being moved to a mid portion of the display area.

In yet another aspect, the present invention provides an address signal generating program for having a computer execute a process of generating an address signal for reading out picture signals from a frame buffer, in which the address signal generating program allows a computer to execute an address signal generating step of generating a readout address signal of the picture signals stored in the frame buffer so that a special effect will be produced in which a picture corresponding to picture signals stored in a frame buffer is presented during display as if it jumps from outside a display area, and in which the picture is rebounded at an outer edge of the display area on the opposite side to the side where the picture is first presented, the picture after a preset number of rebounding events being moved to a mid portion of the display area.

According to the present invention, as described above, the readout address generating means generates a readout address of the picture signals stored in the frame buffer so that a special effect will be produced in which a picture corresponding to the picture signals stored in the frame buffer is rotationally moved about an optional point, provided to the outer rim of a display area at the time of display, as the center of rotation, so as to disappear to outside the display area, thus enabling a novel special picture effect.

According to the present invention, as described above, the readout address generating means generates a readout address of the picture signals stored in the frame buffer so that a special effect will be produced in which a picture corresponding to the picture signals stored in the frame buffer is fractionated into two partial pictures, having a linear boundary line, at the time of display, the partial pictures being rotationally moved in mutually opposite directions, each about one of two points of intersection of the boundary line with the outer rim of the display area, as the center of rotation, the partial pictures thus rotationally moved disappearing to outside the display area, thus enabling a novel special picture effect.

According to the present invention, as described above, the readout address generating means generates a readout address of the picture signals stored in the frame buffer so that a special effect will be produced in which a picture corresponding to the picture signals stored in the frame buffer is fractionated into plural partial pictures, having a linear boundary line, at the time of display, each partial picture being translated so as to disappear to outside the display area, thus enabling a novel special picture effect.

According to the present invention, as described above, the readout address generating means generates a readout address of the picture signals stored in the frame buffer so that a special effect will be produced in which a picture corresponding to the picture signals stored in the frame buffer is fractionated into plural partial pictures, having a wavy boundary line, defined by a preset function, at the time of display, the partial pictures being translated so as to disappear to outside the display area, thus enabling a novel special picture effect.

According to the present invention, as described above, the readout address generating means generates a readout address of the picture signals stored in the frame buffer so that a special effect will be produced in which a picture corresponding to the picture signals stored in the frame buffer is presented as if it jumps from outside the display area at the time of display, and in which the picture is rebounded on an outer edge of the display area on the opposite side to the side where the picture is first presented, with the picture being moved to a mid portion of the display area after a preset number of the rebounding events, thus enabling a novel special picture effect.

BRIEF DESCRIPTION OF THE DRAWINGS

FIG. 3 shows an example of a picture subjected to a rotation effect by the special picture effect device.

FIG. 4 illustrates the center of rotation in the rotation effect.

FIG. 5 shows parameters supplied to a read address generator when carrying out the rotation effect.

FIG. 10 shows an example of a picture processed with the fractionated rotation effect by the special picture effect device.

FIG. 11 illustrates the center of rotation in the fractionated rotation effect.

FIG. 12 shows parameters supplied to the read address generator in executing the fractionated rotation effect.

FIG. 24 shows an example of a picture processed with a rupturing effect by the special picture effect device.

FIG. 25 shows the waveform for fractionating a picture in the rupturing effect.

FIG. 26 shows parameters supplied to the read address generator when carrying out the rupturing effect.

FIG. 33 shows an example of a picture processed with a rebound effect by the special picture effect device.

FIG. 34 shows parameters supplied to the read address generator when carrying out the rebound effect.

FIG. 35 shows a position of descent of a picture in the rebound effect.

DESCRIPTION OF PREFERRED EMBODIMENTS

Figure 1:
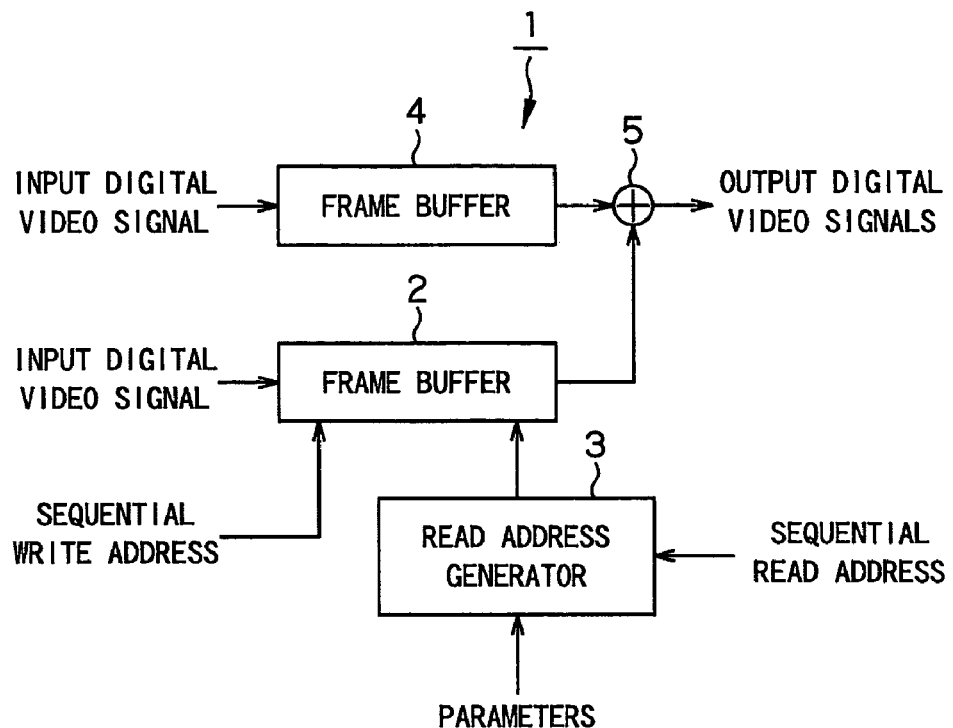
FIG. 1 illustrates the structure of a special picture effect device embodying the present invention.

Referring to the drawings, a special effect device, an address signal generating device, an address signal generating method and an address signal generating program are now explained in detail.

Referring first to FIG. 1, the structure of a special picture effect device, embodying the present invention, is explained. The special picture effect device 1 is a device supplied with digitized video signals to issue an output so that a preset special picture effect will be obtained. The special picture effect device 1 employs a read address control system as a system for applying the special picture effect to the input digital video signals. The read address control system is able to change the address which is valid in reading out pixel data making up a picture frame to achieve a variegated special picture effect. In the following description, the special picture effect is referred to simply as a special effect.

The special picture effect device 1, shown in FIG. 1, includes a frame buffer 2, a read address generator 3, a frame buffer 4 and a picture synthesizing unit 5.

The frame buffer 2 is a buffer memory for transient storage of the input digital video signals on the frame basis. The frame buffer 2 is able to store a plural number of frames, depending on the memory capacity. The digital video signals, supplied to the frame buffer 2, are given sequential write addresses (X, Y) indicating the positions on a frame as the two-dimensional space so as to be then stored in the frame buffer 2. That is, the digital video signals, supplied to the frame buffer 2, are stored as picture data in addresses (X, Y) in the memory space in the frame buffer 2.

Meanwhile, the write addresses (X, Y) are the same as the addresses (X, Y). That is, the write addresses (X, Y) are the addresses used in writing the digital video signals in the frame buffer 2 and become the addresses (X, Y) after having been written in the frame buffer 2. In the following description, it is assumed that frame-based picture data have already been stored in the frame buffer 2, and that the addresses in which are stored the picture data are the addresses (X, Y).

It is also assumed that the picture data stored in the frame buffer 2 has undergone the cropping processing of extracting picture data of an area which becomes valid in executing the special effect as later explained.

The read address generator 3 calculates the read addresses in reading out the picture data stored in the frame buffer 2, depending on the type of the special effect, in accordance with the read address control system employed in the special picture effect device 1. Using the so calculated read addresses, the read address generator 3 reads out the picture data stored in the frame buffer 2 to permit outputting of the picture to which the special effect has been applied.

Specifically, the read address generator 3 converts the sequential read addresses (x, y), used in reading out the picture data from the frame buffer 2, into the addresses (X, Y) of the picture data stored in the frame buffer 2, by calculations employing the parameters which differ with the type of the special effect. The read address generator 3 specifies the picture data, stored in the frame buffer 2, with the addresses (X, Y) converted from the sequential read addresses (x, y), to permit the picture data to be sequentially output in order to output the picture processed with the special effect.

For example, consider a picture frame 6 and a picture frame 7 shown in FIG. 12. The picture frame 6 is picture data stored in the frame buffer 2. The picture frame 7 is picture data read out from the frame buffer 2 such as to produce a special effect. That is, the picture frame 6 stored in the frame buffer 2 is read out with the address (X, Y) designated by the read address generator 3 to output the picture frame 7 to which the special effect has been applied.

In case the picture frame 6 and the picture frame 7 are each made up by picture data of (4×6) matrix, the picture frame 7 has the read addresses (x, y) sequentially designated in the horizontal scanning direction in a sequence of (1, 1) component, (1, 2) component and so forth. Responsive to this designation of the read addresses (x, y), the read address generator 3 determines the addresses (X, Y) of the picture frame 6 stored in the frame buffer 2, using the parameters which differ with the type of the special effect, in order to read out the picture data.

Figure 2:
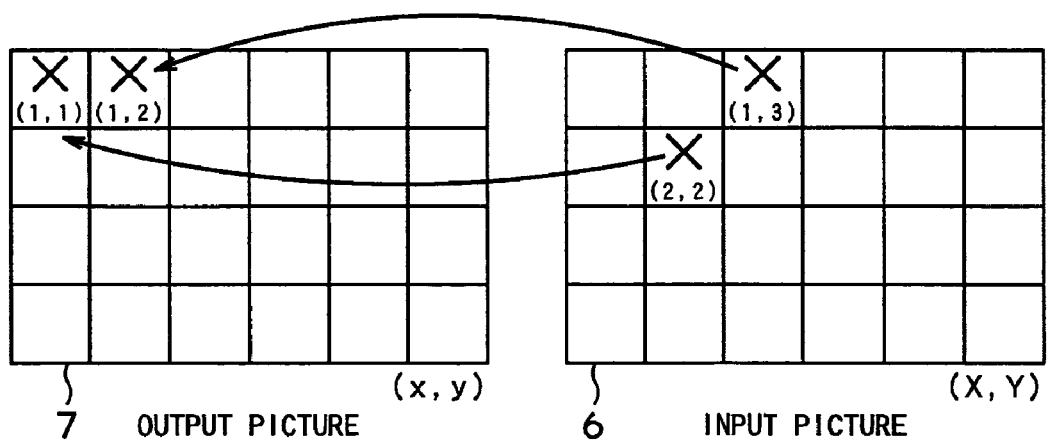
FIG. 2 shows a specified example for illustrating a read address control system as used in the special picture effect device.
Figure 6:
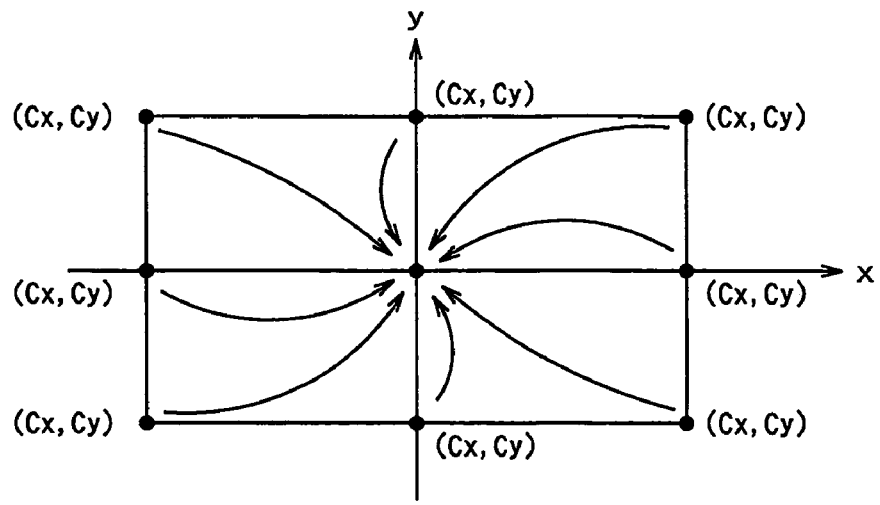
FIG. 6 illustrates how the center of rotation in the rotation effect is converted to the point of origin.
Figure 7:
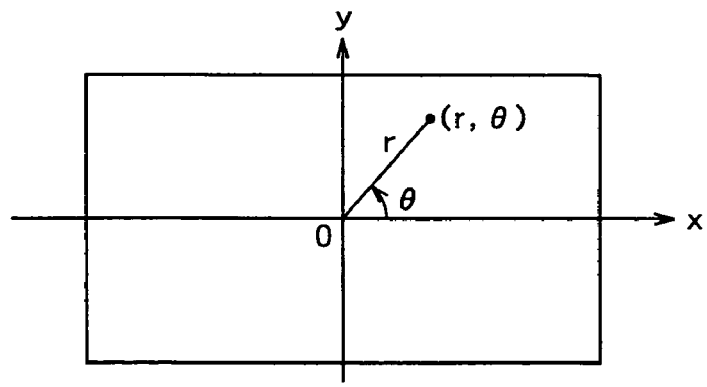
FIG. 7 illustrates polar coordinate conversion in the rotation effect.
Figure 8:
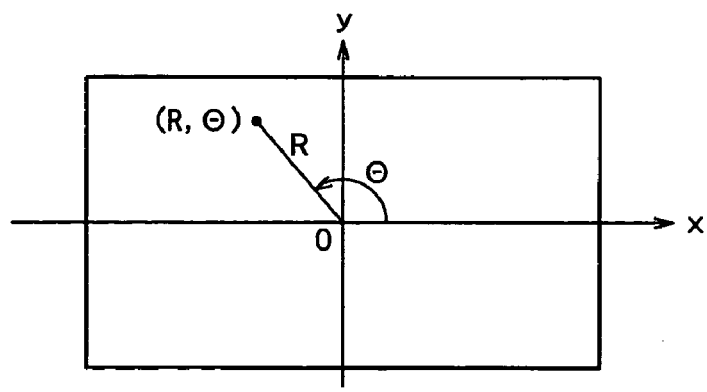
FIG. 8 illustrates address conversion in the rotation effect.

In FIG. 2, if, in order to form the picture frame 7, processed with the special effect, the read address (1, 1) is specified by the read address generator 3, the picture data stored in the address (2, 2) of the picture frame stored in the frame buffer 2 is read out. If the read address (1, 2) is specified, the picture data stored in the address (1, 3) of the picture frame is read out.

In this manner, the picture frame 6 stored in the frame buffer 2 is output as the picture frame 7, to which the special effect has been applied.

Thus, the special picture effect device 1, described above, is able to read out the picture data, stored in the frame buffer 2, with the address (X, Y) designated by the read address generator 3, to permit the outputting of a picture to which the special effect has been applied;

The detailed operation to be performed in the read address generator 3 will be explained later when the special effect is subsequently explained.

The special picture effect device 1 also includes the frame buffer 4 and the picture synthesizing unit 5. Similarly to the frame buffer 2, the frame buffer 4 is a buffer for transiently storing picture data on the frame basis. The picture data, stored in the frame buffer 4, is output as a picture not processed with the special effect, and is synthesized to an output picture from the frame buffer 2.

By providing the frame buffer 4 and the picture synthesizing unit 5, such outputting is possible in which, in case the output picture from the frame buffer 2, processed with the special effect, should disappear from the picture surface, an output picture from the frame buffer 4 appears on the background. An efficacious technique may be realized in case it is desirable to emphasize a scene change by the special effect.

There are plural special effects realized by the special picture effect device 1, as now explained in detail.

The special effects, that may be realized with the special picture effect device 1, may be enumerated by 1) a rotation effect, 2) a fractionated rotation effect, 3) a fractionated movement effect, 4) a rupturing effect and 5) a rebound effect. These special effects are now respectively explained.

1. Rotation Effect

The rotation effect is such a special effect in which a picture is rotated about an optional point, accorded to the outer rim of the picture demonstrated as shown in FIG. 3, as the center of rotation, to permit a background picture to appear as it is read out from a frame buffer 4.

FIG. 4 shows several examples of the positions of the center of rotation about which is executed the rotation effect. As shown in FIG. 4, the center of rotation (ICenterType) may be set in any of eight locations of LB (left bottom), RB (right bottom), LT (left top), RT (right top), B (bottom), T (top), L (left) and R (right). The direction of picture rotation may be set to clockwise or counterclockwise. These values are parameters supplied to the read address generator 3, as shown in FIG. 5.

Among other parameters to be supplied to the read address generator 3 is a parameter trans. This parameter trans is a parameter containing the time element which accords the quantity of movement of a picture to be rotated. If the parameter value is 0 or 1, the picture is not moved at all or disappears from the picture surface, respectively.

Specifically, the parameter trans is defined so that trans= (number of frames that took place as from the starting frame of the processing)/(total number of frames processed). For example, if it is desired to switch from the picture A to the picture B in e.g. a time of 30 frames, the values of trans=0/30, 1/30, 2/30, . . . , 29/30, 30/30 are received sequentially to carry out the processing on the frame basis.

When the sequential read address (x, y) is designated to the read address generator 3, the address (X, Y) of picture data read out from the frame buffer 2 is converted and found by the following process:

First, in finding the address (X, Y), associated with the read address (x, y), it is easier to consider the rotation about the point of origin as the center than the rotation about the center point (cx, cy). Thus, the following equation (1-1):

$$x0 = x - cx$$

$$y0 = y - cy \qquad (1\text{-}1)$$

is used to convert the read address (x, y) to an address (x0, y0) about the point of origin as the center.

The following equation (1-2):

$$r = \sqrt{x0^2 + y0^2} \qquad (1\text{-}2)$$

$$\theta = \arctan\left(\frac{y0}{x0}\right)$$

is then used to convert the rectangular coordinate system into the polar coordinate system.

Figure 17:
FIG. 17 shows an example of a picture processed with the fractionated movement effect by the special picture effect device.

This converts the address (x0, y0) to an address (r, θ), as shown in FIG. 17.

Figure 18:
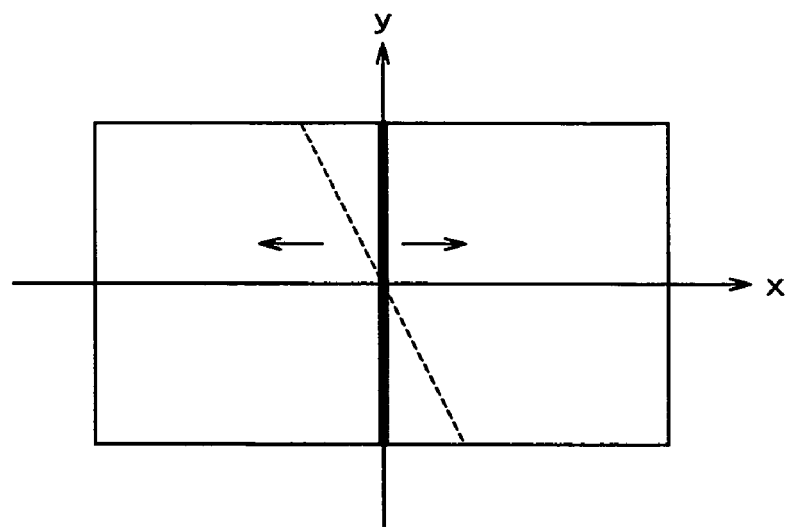
FIG. 18 illustrates the case of fractionating a picture in the vertical direction in the fractionated movement effect.

The address (r, θ) then is rotated, by the following equation (1-3):

$$R = r$$

$$\Theta = f_1(\theta) \qquad (1\text{-}3)$$

to calculate the as-rotated address (R, Θ), as shown in FIG. 18.

Meanwhile, the function $f_1(\theta)$ in the equation (1-3) may be represented by the following equation (1-4):

$$f_1(\theta) = \theta + \text{trans} \times C_1 \times C_2 \qquad (1\text{-}4)$$

where $$C_1 = \begin{cases} \frac{\pi}{2} & (1CenterType = leftBottom, RightBottom, LeftTop \text{ or } RightTop) \\ \pi & (\text{otherwise}) \end{cases} \qquad (1\text{-}5)$$

$$C_2 = \begin{cases} 1.0 & (1RotateType = \text{Clockwise}) \\ -1.0 & (1RotateType = \text{Counterclockwise}) \end{cases} \qquad (1\text{-}6)$$

The constants $C_1$ and $C_2$ used in the equation (1-4) are determined as the equations (1-5) and (1-6) by the parameters shown in FIG. 5. The constant $C_1$ shown in the equation (1-5) is in keeping with the fact that, if the center of rotation is at one of the four corners of the picture, the picture disappears from the picture surface on rotation through 90° ($\pi/2$ [rad]), and that, if the center of rotation is on the outer rim of the picture, the picture disappears from the picture surface on rotation through 180° (,, [rad]).

The address (R, ,, ) obtained on rotation is converted from the polar coordinate system to the address (X0, Y0) of the rectangular coordinate system, using the equation (1-7):

$$X0 = R \cos \Theta$$

$$Y0 = R \sin \Theta \qquad (1-7).$$

The address (X0, Y0) is the address obtained on rotation about the center of origin of the rectangular coordinate system. Thus, using the following equation (1-8):

$$X0 = R \cos \Theta$$

$$Y0 = R \sin \Theta \qquad (1-8)$$

an address (X, Y) rotated about the center point (cx, cy) is found.

In this manner, the read address generator 3 converts the read address (x, y) to the address (X, Y) of the picture data stored in the frame buffer 2.

Figure 9:
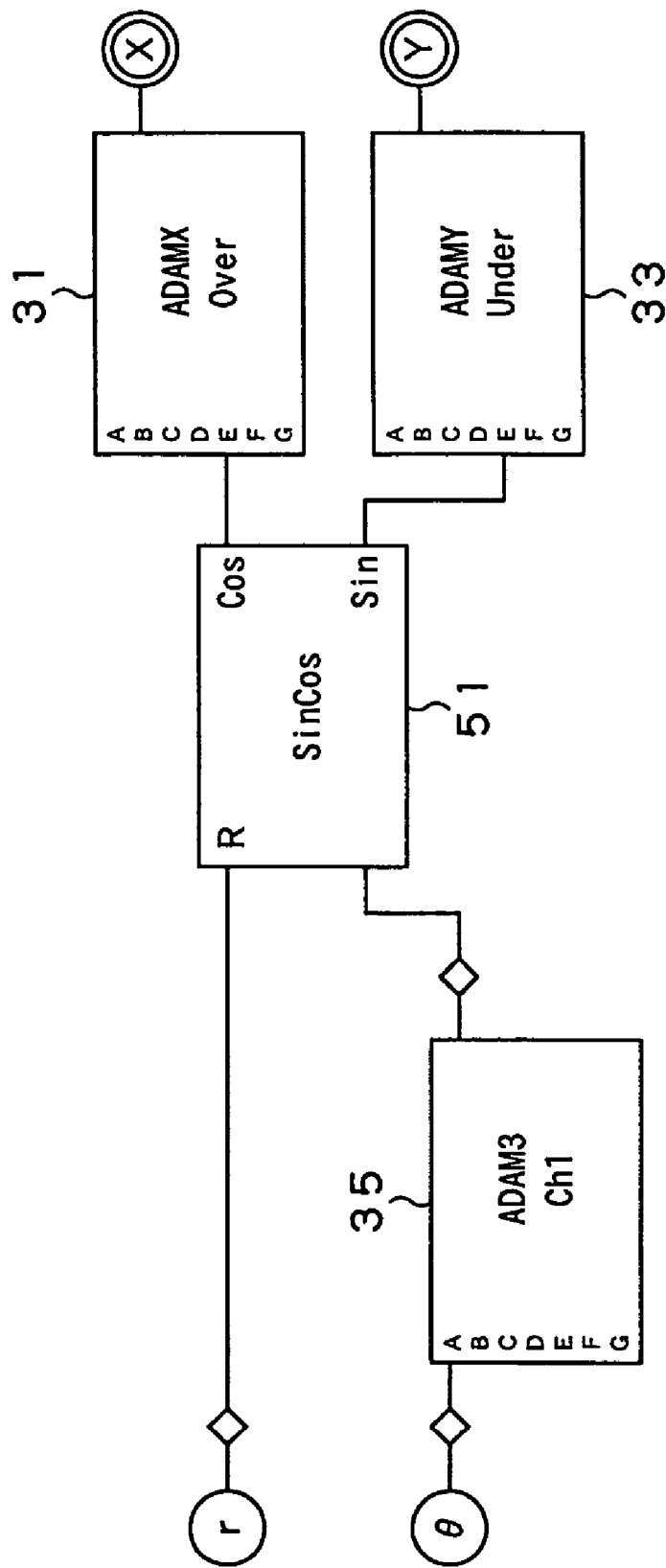
FIG. 9 illustrates the hardware structure of a read address generator for achieving the rotation effect.
Figure 13:
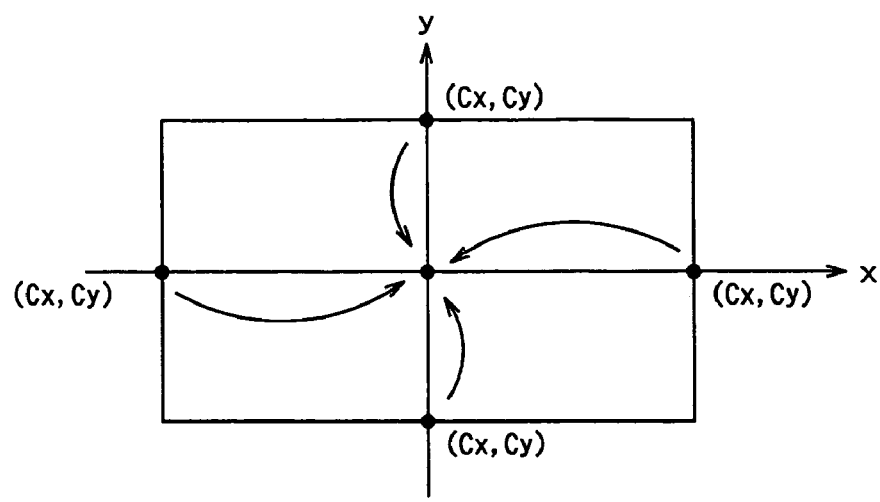
FIG. 13 illustrates the manner of conversion of the center of rotation in the fractionated rotation effect to the point of origin.

Then, referring to FIG. 9, the hardware structure of the read address generator 3 in case of carrying out the rotation effect is explained.

The read address generator 3 includes plural modules, such as an adder-multiplier and a polar coordinate to rectangular coordinate converter, and executes the above calculations, based on the combination of these modules.

Figure 19:
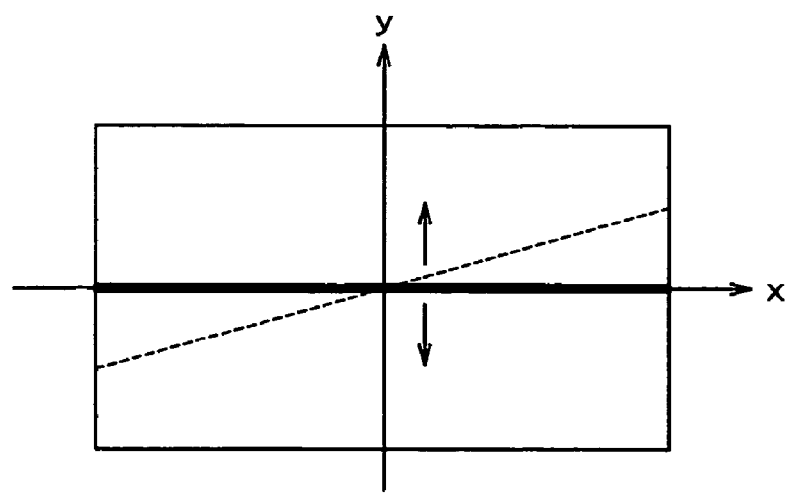
FIG. 19 illustrates the case of fractionating a picture in the horizontal direction in the fractionated movement effect.

In carrying out the effect of rotation about an optional center, an ADAMX (Over) 31, an ADAMY (Over) 33, an ADAM(Ch1) 35, and a coordinate converter 51, are used, as shown in FIG. 19.

The ADAMX (Over) 31, ADAMY (Over) 33 and the ADAM (Ch1) 35 are provided with terminals A to G, and apply the calculations of (A+B)×(C+D)+E+F+G to values supplied to these terminals by addition and multiplication. For the terminals A to G, constant numbers or the cross-points indicated by the diamond-shaped marks in the drawing may be designated.

The coordinate converter 51 converts the coordinate system from the polar coordinate system to the rectangular coordinate system.

The operation of conversion from the read address (x, y) to the address (X, Y) by the above-described read address generator 3 is now explained. Meanwhile, the calculations shown in the equations (1-1) and (1-2) have been carried out by matrix calculations, and the address (r, ,,), obtained on conversion to the polar coordinate system, are supplied to the read address generator 3.

The ADAM(Ch1) 35 is supplied with an address ,, and sums ,, to a constant to carry out the equation (1-4) to find a function $f_1(,,)$. The function $f_1(,,)$ is supplied, along with the address r, to the coordinate converter 51. The function $f_1(,,)$ and the address r is the address (R, ,,), from the equation (1-3).

The coordinate converter 51 converts the address (R, ,,) into the rectangular coordinate to calculate the address (X0, Y0).

The ADAMX (Over) 31 sums cx to Rcos,, to execute (1-8) to calculate the address X.

The ADAMX (Over) 33 sums cy to Rsin,, to execute (1-8) to calculate the address Y.

In this manner, the special picture effect device 1 uses the hardware, forming the read address generator 3, by a suitable combination, for converting the read address (x, y), entered to the read address generator 3, into the address (X, Y), used for outputting a picture corresponding to the picture which is stored in the frame buffer 2 and which has been subjected to the rotation effect.

2. Fractionated Rotation Effect

The fractionated rotation effect is such a special effect in which a picture is fractionated and rotated, about an optional point on the outer rim of a displayed picture, shown in FIG. 10, as the center of rotation, as if the picture is cleft into two, such that a background picture is caused to appear as it is read from the frame buffer 4. As may be presupposed from the expression that the picture is fractionated and rotated as if the picture is cleft into two, the respective pictures are rotated clockwise and counterclockwise.

FIG. 11 shows several examples of the positions of the center of rotation about which the fractionated rotation effect is carried out. As may be seen from FIG. 11, the center of rotation (ICenterType) may be set to any one of B (bottom), T (top), L (left) and R (right). If the center of rotation is Top or Bottom, the picture is fractionated along a dotted line a passing through the center of rotation and the resulting two pictures are rotated in the arrow directions. If the center of rotation is Left or Right, the picture is fractionated along a dotted line b passing through the center of rotation and the resulting two pictures are rotated in the arrow directions. As may be seen from FIG. 12, these centers of rotation are parameters supplied to the read address generator 3.

Among other parameters to be supplied to the read address generator 3 is a parameter trans. This parameter trans is a parameter containing the time element which furnishes the quantity of movement of a picture to be rotated. If the parameter value is 0 or 1, the picture is not moved at all or disappears from the picture surface, respectively.

Specifically, the parameter trans is defined so that trans= (number of frames that took place as from the starting frame of the processing)/(total number of frames processed). For example, if it is desired to switch from the picture A to the picture B in e.g. a time of 30 frames, the values of trans=0/30, 1/30, 2/30, . . . , 29/30, 30/30 are received sequentially to carry out the processing on the frame basis.

When the sequential read address (x, y) is designated to the read address generator 3, the address (X, Y) of picture data read out from the frame buffer 2 is converted and found by the following process:

First, in finding the address (X, Y), associated with the read address (x, y), it is easier to consider the rotation about the point of origin as the center than the rotation about the center point (cx, cy) as the center. Thus, the following equation (2-1):

$$x0 = x - cx$$

$$y0 = y - cy \qquad (2-1)$$

is used to convert the read address (x, y) to an address (x0, y0) about the point of origin as the center.

The following equation (2-2):

$$r = \sqrt{x0^2 + y0^2} \qquad (2-2)$$

$$\theta = \arctan\left(\frac{y0}{x0}\right)$$

then is used to convert the rectangular coordinate system into the polar coordinate system.

Figure 14:
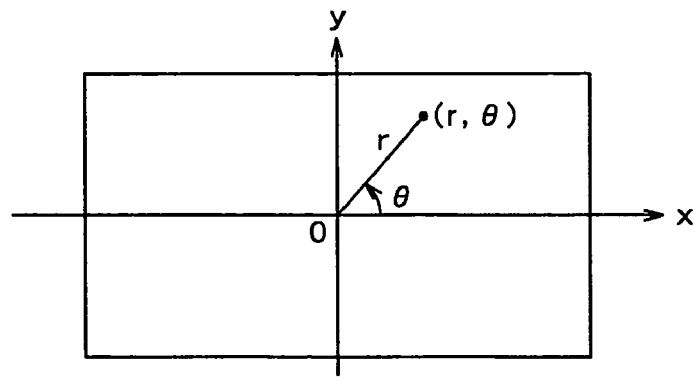
FIG. 14 illustrates the conversion to the polar coordinate in the fractionated rotation effect.

This converts the address (x0, y0) to an address (r, ,,), as shown in FIG. 14.

Figure 15:
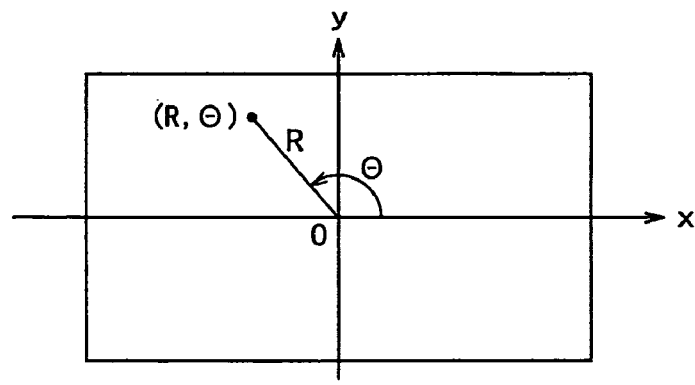
FIG. 15 illustrates address conversion in the fractionated rotation effect.

Then, in case the center of rotation is in the Bottom, the address (r, ,,) is rotated, and the post-rotation address (R, ,,) following the rotation, as shown in FIG. 15, may be calculated by the equation (2-3):

$$R=r$$

$$\Theta = f_1(\theta) \quad (2\text{-}3)$$

Meanwhile, the function $f_1(,,)$ in the equation (2-3) may be represented by the equation (2-4):

$$f_1(\theta) = \begin{cases} \theta + trans \times \frac{\pi}{2} & (0 \le \theta \le \alpha) \\ \theta + \pi & (\alpha < \theta \le \pi - \alpha) \\ \theta - trans \times \frac{\pi}{2} & (\pi - \alpha < \theta \le \pi) \end{cases} \quad (2\text{-}4)$$

where $\alpha = \frac{\pi}{2} - trans \times \frac{\pi}{2}$

Then, the address (R, ,,), obtained on rotation, is converted from the polar coordinate system to the address (X0, Y0) of the rectangular coordinate system, using the equation (2-5):

$$X0 = R\cos\Theta$$

$$Y0 = R\sin\Theta \quad (2\text{-}5)$$

The address (X0, Y0) is the address obtained on rotation about the center of origin of the rectangular coordinate system. Thus, using the following equation (2-6):

$$X = X0 + cx$$

$$Y = Y0 + cy \quad (2\text{-}6)$$

an address (X, Y) rotated about the center point (cx, cy) is found.

In this manner, the read address generator 3 converts the read address (x, y) to the address (X, Y) of the picture data stored in the frame buffer 2.

Meanwhile, in case the center of rotation is Top, the equation (2-7):

$$\Theta = f_1(\theta - \pi) + \pi \quad (2\text{-}7)$$

is used to find,, .

In case the center of rotation is Left, the equation (2-8):

$$\Theta = f_1\left(\theta + \frac{\pi}{2}\right) - \frac{\pi}{2} \quad (2\text{-}8)$$

is used to find,, .

In case the center of rotation is Right, the equation (2-9):

$$\Theta = f_1\left(\theta - \frac{\pi}{2}\right) + \frac{\pi}{2} \quad (2\text{-}9)$$

is used to find,, .

Figure 16:
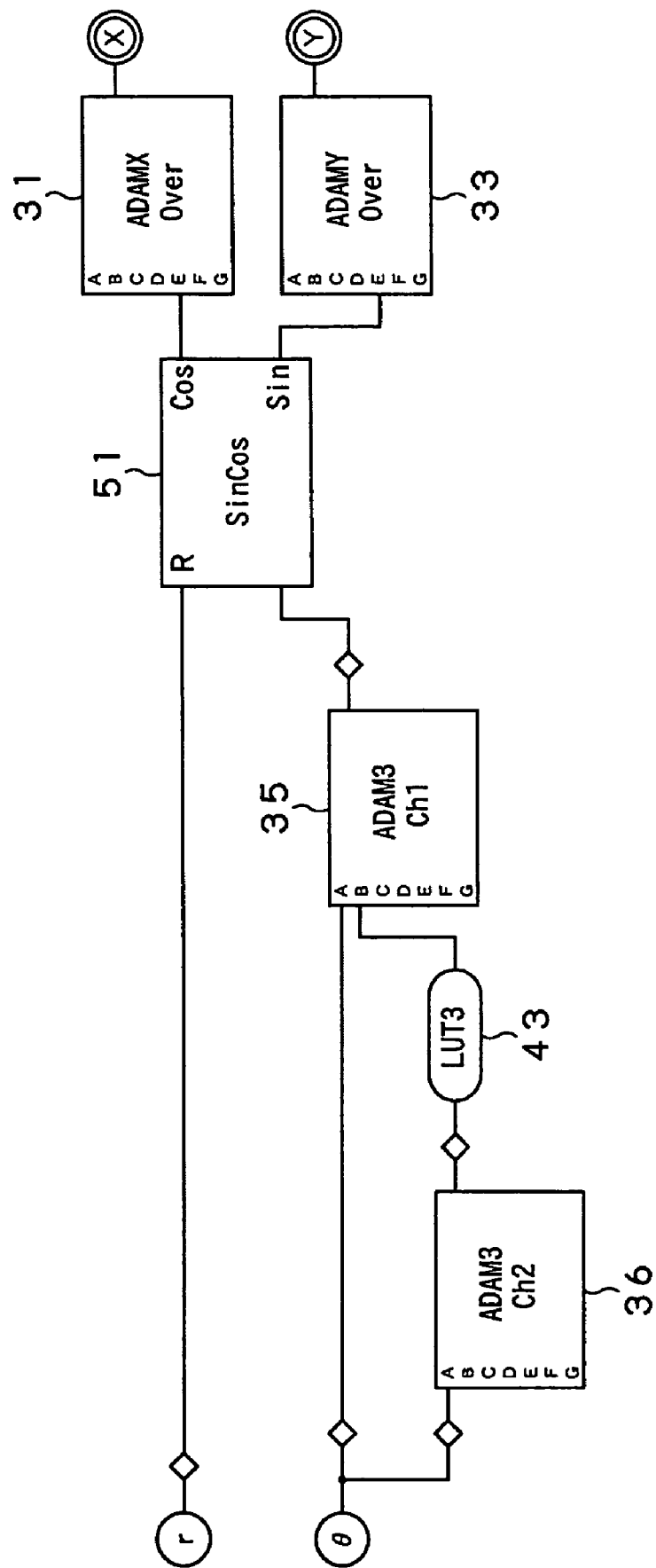
FIG. 16 illustrates the hardware structure of the read address generator for achieving the fractionated rotation effect.

Then, referring to FIG. 16, the hardware structure of the read address generator 3 in case of carrying out the fractionated rotation effect is explained.

The read address generator 3 includes plural modules, such as an adder-multiplier and a polar coordinate to rectangular coordinate converter, and executes the above calculations, based on the combination of these modules.

In carrying out the fractionated rotation effect, the LUT (look-up table) 43, ADAMX (Over) 31, ADAMY (Over) 33, ADAM(Ch1) 35, ADAM(Ch2) 36 and the coordinate converter 51 of the read address generator 3 are used, as shown in FIG. 16.

The LUT 43 is a RAM (random access memory) tables, referred to by an address designated by cross-points indicated by diamond-shaped marks in the drawing. The data are set by a central processing unit (CPU), not shown. In the LUT 43, the function $f_1(,,)$ is set by the CPU, not shown.

The ADAMX (Over) 31, ADAMY (Over) 33, ADAMX (Ch1) 35 and the ADAMY (Ch2) 36 are each provided with terminals A to G, and apply the calculations of (A+B)×(C+D)+E+F+G by addition and multiplication. For the terminals A to G, constant numbers or the cross-points indicated by diamond-shaped marks in the drawing may be designated.

The coordinate converter 51 converts the coordinate system from the polar coordinate system to the rectangular coordinate system.

The operation of conversion from the read address (x, y) to the address (X, Y) by the above-described read address generator 3 is now explained. Meanwhile, the calculations shown in the equations (2-1) and (2-2) have been carried out by matrix calculations, and the address (r, ,,), obtained on conversion to the polar coordinate system, are supplied to the read address generator 3.

The ADAM(Ch2) 36 is responsive to the ICenterType to subtract 0, ,,,−,,/2 and,,/2 from the address ,, to send the result to the LUT 43.

The ADAM(Ch1) 35 is also responsive to the ICenterType to add 0, ,,,−,,/2 and ,,/2 to the output from the LUT 43 to execute the equations (2-3), (2-7), (2-8) or (2-9).

Since the output of the ADAMX (Ch1) 35 is the address (R, ,,), the coordinate converter 51 executes the equation (2-5), to effect coordinate transformation to calculate the address (X0, Y0)=(Rcos,, , Rsin,,). Rcos,, and Rsin,, are supplied to the ADAMX (Over) 31 and to the ADAMY (Over) 33.

The ADAMX (Over) 31 sums cx to Rcos,, , supplied from the coordinate converter 51, to execute the equation (2-6), to calculate the address X.

The ADAMY (Over) 33 sums cy to Rsin,, , supplied from the coordinate converter 51, to execute the equation (2-6), to calculate the address Y.

In this manner, the special picture effect device 1 uses the hardware, forming the read address generator 3, by a suitable combination, for converting the read address (x, y), entered to the read address generator 3, into the address (X, Y), used for outputting a picture corresponding to the picture which is stored in the frame buffer 2 and which has been subjected to the fractionated rotation effect.

2. Fractionated Movement Effect

The fractionated movement effect is such a special effect in which a picture is divided as shown in FIG. 17, and the so divided picture is translated along the x-axis direction and/or along the y-axis direction to cause a background picture to appear as it is read out from the frame buffer 4.

Figures 20, 21:
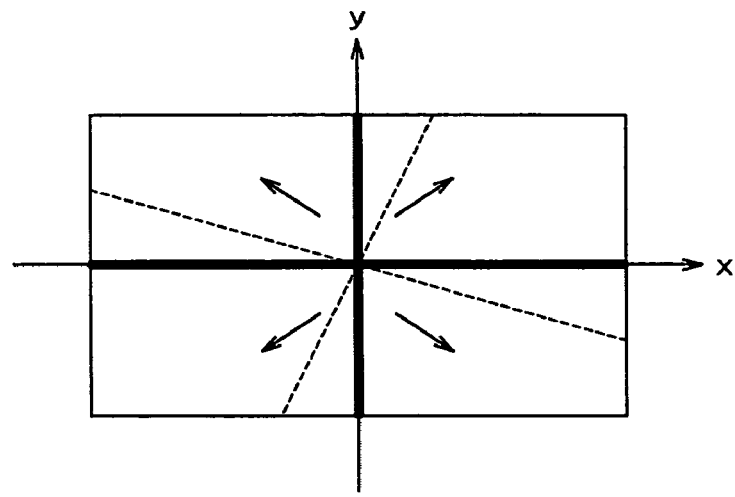
FIG. 20 illustrates the case of fractionating a picture in the vertical and horizontal directions in the fractionated movement effect.
FIG. 21 shows parameters supplied to the read address generator in executing the fractionated movement effect.

In the fractionated movement effect, a picture is divided in two along a vertical direction, and the resulting pictures are translated along the x-axis direction, indicated by an arrow, as shown in FIG. 18 (Vertical), a picture is divided in two along a horizontal direction, and the resulting pictures are translated along the y-axis direction, indicated by an arrow, as shown in FIG. 19 (Horizontal) or a picture is divided in four along horizontal and vertical directions, and the resulting pictures are translated along the x-axis and y-axis directions, indicated by arrows, as shown in FIG. 20 (Cross). In dividing the pictures shown in FIGS. 18 to 20, the picture dividing line(s) may be inclined, as indicated by dotted lines in the drawings.

FIG. 21 shows parameters supplied to the read address generator 3 when executing the fractionated movement effect. The picture fractionating type is specified as IBarnType. The default is Vertical. By the parameter fixSlant, the tilt of the fractionating line for fractionating a picture may be set in a range of −45 to 45°.

By the parameter trans, the amount of movement of the fractionated picture may be set. If the parameter value is 0 or 1, the picture is not moved at all or disappears from the picture surface, respectively.

This parameter trans is a parameter containing the time element. Specifically, the parameter trans is defined so that trans=(number of frames that took place as from the starting frame of the processing)/(total number of frames processed). For example, if it is desired to switch from the picture A to the picture B in e.g. a time of 30 frames, the values of trans=0/30, 1/30, 2/30, . . . , 29/30, 30/30 are received sequentially to carry out the processing on the frame basis.

When the sequential read address (x, y) is designated to the read address generator 3, the address (X, Y) of picture data read out from the frame buffer 2 is converted and found by the following process:

First, the read address (x, y) is set to the address (x0, y0), by effecting the conversion for setting the center of movement of the fractionate pictures to the point of origin, using the equation (3-1):

$$x0 = x - cx$$

$$y0 = y - cy \quad (3\text{-}1).$$

Then, if IBarnType is Vertical, the picture is split in two in the vertical direction, and the resulting pictures are moved along the x-direction, using the equation (3-2):

$$X0 = f_2(x0 - f_1(y0)) + f_1(y0)$$

$$Y0 = y0 \quad (3\text{-}2).$$

The functions $f_1(y0)$ and $f_2(t)$ in the equation (3-2) are represented in the equations (3-3) and (3-4), respectively:

$$f_1(y0) = y \tan \theta \quad (3\text{-}3)$$

$$f_2(t) = \begin{cases} t+T & (t \leq -T) \\ \text{Max} & (-T < t \leq T) \\ t-T & (T < t) \end{cases} \quad (3\text{-}4)$$

where $$\theta = \frac{\text{fixSlant}}{360.0} \times 2\pi$$

$T = \text{trans} \times 0.5 \times (\text{picture width} + \text{picture height} \times \tan_n)$ $t = xo - f_1(y0)$.

In the equation (3-4), Max indicates that an address other than a picture that may be specified by the address (X0, Y0) is being specified. If Max is specifying an address where there is stored a blue picture stored in the frame buffer 2, another picture may readily be synthesized to an area which has become Max, using the above picture as a key signal.

Moreover, since the address (X0, Y0) has moved the center position, the address (X, Y) is found, using the equation (3-5):

$$X = X0 + cx$$

$$Y = Y0 + cy \quad (3\text{-}5).$$

In this manner, the read address generator 3 converts the read address (x, y) to the address (X, Y) of the picture data stored in the frame buffer 2.

First, if IBarnType is Horizontal, the picture is divided in two in the horizontal direction and the resulting pictures are moved along the y-axis direction, using the equation (3-6):

$$X0 = x0$$

$$Y0 = f_2(y0 - f_1(x0)) + f_1(x0) \quad (3\text{-}6).$$

The functions $f_1(x0)$ and $f_2(t)$ in the equation (3-6) are represented in the equations (3-7) and (3-8), respectively:

$$f_1(x0) = -x0 \tan \theta \quad (3\text{-}7)$$

$$f_2(t) = \begin{cases} t+T & (t \leq -T) \\ \text{Max} & (-T < t \leq T) \\ t-T & (T < t) \end{cases} \quad (3\text{-}8)$$

where $$\theta = \frac{\text{fixSlant}}{360.0} \times 2\pi$$

$T = \text{trans} \times 0.5 \times (\text{picture width} + \text{picture height} \times \tan_n)$ $t = y0 - f_1(x0)$.

If IBarnType is cross, the picture is divided into four in the vertical and horizontal directions, and the resulting pictures are moved in the x-axis direction and in the y-axis direction, using the equation (3-9):

$$X0 = f_3(x0 - f_1(y0)) + f_1(y0)$$

$$Y0 = f_3(y0 - f_2(x0)) + f_2(x0) \quad (3\text{-}9).$$

Meanwhile, the functions $f_1(y0)$, $f_2(x0)$ and $f_3(t)$ in the equation (3-9) are represented by the equations (3-10), (3-11) and (3-12), respectively:

$$f_1(y0) = y \tan \theta \quad (3\text{-}10)$$

$$f_2(x0) = -x \tan \theta \quad (3\text{-}11)$$

$$f_3(t) = \begin{cases} t+T & (t \leq -T) \\ \text{Max} & (-T < t \leq T) \\ t-T & (T < t) \end{cases} \quad (3\text{-}12)$$

where $$\theta = \frac{\text{fixSlant}}{360.0} \times 2\pi$$

$T = \text{trans} \times 0.5 \times \text{Max}\{\text{picturewidth} + \text{pictureheight} \times \tan \theta, \text{pictureheight} + \text{picturewidth} \times \tan \theta\}$ $t = x0 - f_1(y0)$ or $y0 - f_2(x0)$.

In the equations (3-8) and (3-12), Max indicates that an address other than a picture that may be specified by the address (X0, Y0) is being specified. If Max is specifying an address where there is stored a blue picture stored in the frame buffer 2, another picture may readily be synthesized to an area which has become Max, using the above picture as a key signal.

Figure 22:
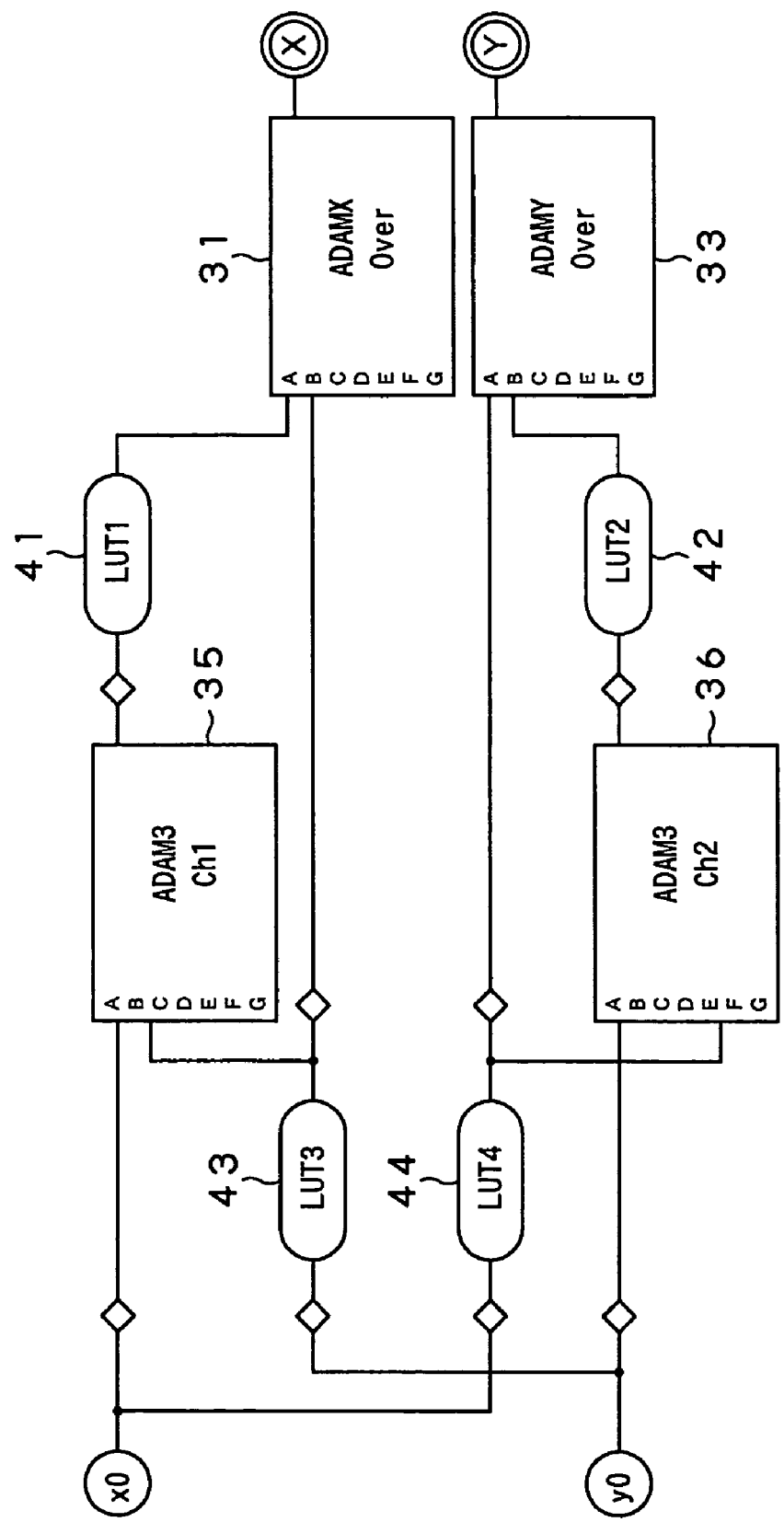
FIG. 22 illustrates the hardware structure of the read address generator for fractionating a picture in the vertical or horizontal direction for realizing the fractionated rotation effect.
Figure 23:
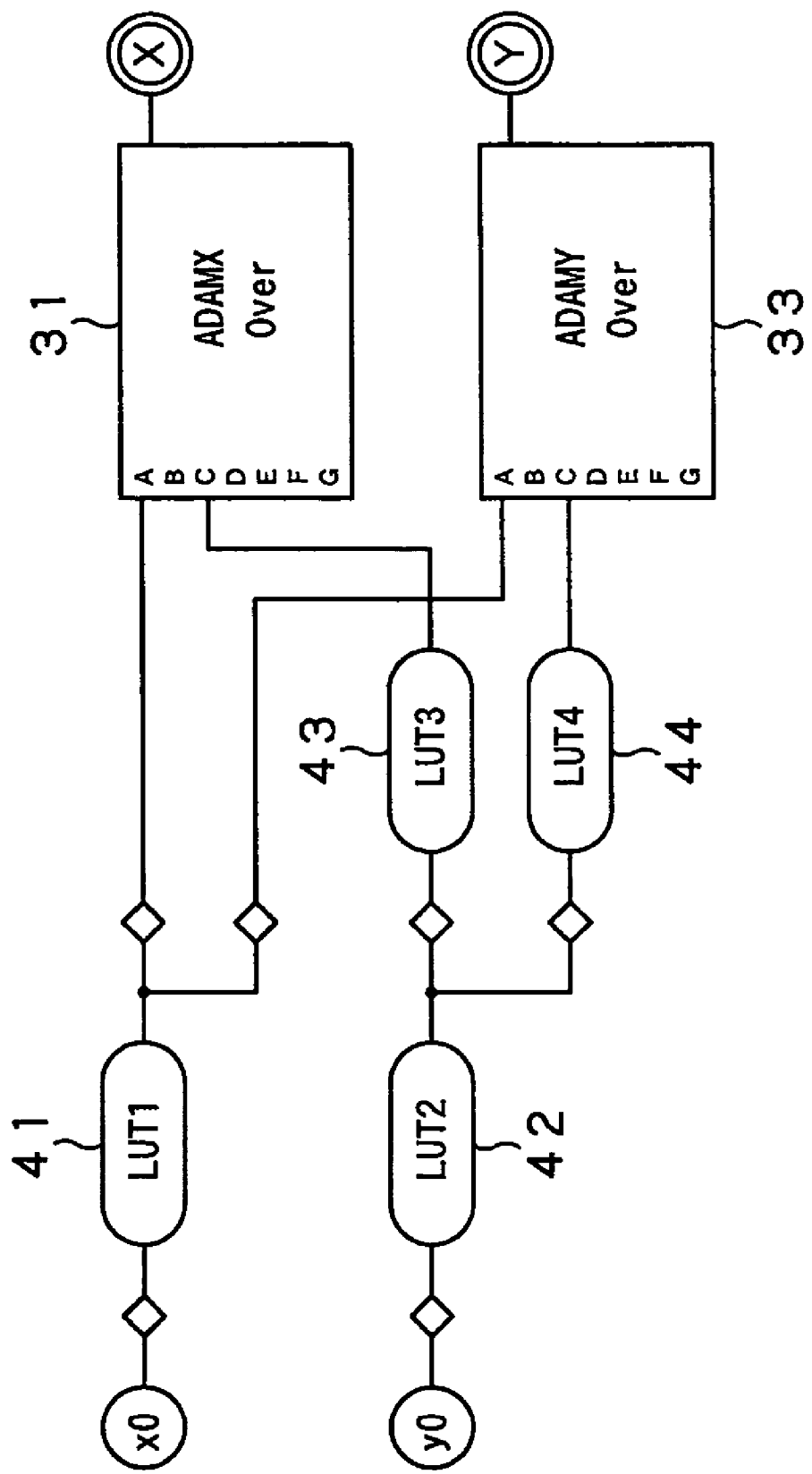
FIG. 23 illustrates the hardware structure of the read address generator for fractionating a picture in the vertical and horizontal directions for realizing the fractionated rotation effect.

Then, referring to FIGS. 22 and 23, the hardware structure of the read address generator 3 in case of carrying out the fractionated movement effect is explained.

In carrying out the fractionated movement effect, the hardware structure of the read address generator 3 differs with the difference in the IBarnType which is the sort of the fractionation. First, the case in which the IBarnType is Vertical is explained.

The read address generator 3 includes plural modules, such as an adder-multiplier and a polar coordinate to rectangular coordinate converter, and executes the above calculations, based on the combination of these modules.

In carrying out the fractionated movement effect (IBarnType=Vertical), the LUTs (look-up table) 41 to 44, the ADAMX (Over) 31, ADAMY (Over) 33, ADAM(Ch1) 35 and the ADAM(Ch2) 36 of the read address generator 3 are used.

The LUTs 41 to 44 are RAM (random access memory) tables, referred to by an address designated by cross-points indicated by diamond-shaped marks in the drawing. The data are set by a central processing unit (CPU), not shown. In the LUTs 41 to 44 are set the functions $f_2(t)$, $y\times(-\tan_{,,})$ and $x\times\tan_{,,}$, shown by the equation (3-4). The LUT 42 is set so that the value of the ADAM(Ch2) 36 will be output directly (through-output).

The ADAMX (Over) 31, ADAMY (Over) 33, ADAMX (Ch1) 35 and the ADAMY (Ch2) 36 are each provided with terminals A to G, and apply the calculations of $(A+B)\times(C+D)+E+F+G$ by addition and multiplication. For the terminals A to G, constant numbers or the cross-points indicated by diamond-shaped marks in the drawing may be designated.

The operation of conversion from the read address (x, y) to the address (X, Y) by the above-described read address generator 3 is now explained. Meanwhile, the calculations shown in the equations (2-1) and (2-2) have been carried out by matrix calculations, by way of pre-processing, and the address (x0, y0), obtained on conversion, are supplied to the read address generator 3.

The ADAM(Ch1) 35 sums $y0\times(-\tan_{,,})$, supplied from the LUT 43, from x0, to output the result to the LUT 41. The LUT 41 enters an output of the ADAM(Ch1) 35 to the function $f_2(t)$ to route the result to the ADAMX (Over) 31. The ADAMX (Over) 31 subtracts the output from the LUT 41 and the output from the LUT 43 to calculate the address X0 shown in the equation (3-2).

The ADAM(Ch2) 36 subtracts $x0\times(\tan_{,,})$, supplied from LUT 44, from y0, to route the result to the LUT 42. The LUT 42 directly outputs the output from the ADAM(Over) 33. The ADAMY (Over) 33 sums the output from the LUT 42 and the output from the LUT 44 to calculate the address Y0 shown by the equation (3-2).

The case where IBarnType is Horizontal is now explained. When IBarnType is Horizontal, as when IBarnType is Vertical, the structure of the read address generator 3 is as shown in FIG. 122.

The sole difference is that the function f2(t) is set in the LUT 42 and the LUT 41 is set so that the value of the ADAM(Ch2) 36 will be output directly (through-output).

The ADAM(Ch1) 35 subtracts $y0\times(-\tan_{,,})$, supplied from the LUT 43, from x0, to output the result to the LUT 41. The LUT 41 sends the output from the ADAM(Ch1) 35 directly to the ADAMX (Over) 31. The ADAMX (Over) 31 sums the output from the LUT 41 to the output of the LUT 43 to calculate the address X0 shown by the equation (3-6).

The ADAM(Ch2) 36 subtracts $x0\times(\tan_{,,})$, supplied from the LUT 44, from y0, to output the result to the LUT 42. The LUT 42 enters the output from the ADAM(Ch2) 36 to the function $f_2(t)$ to send the result to the ADAMY (Over) 33. The ADAMY (Over) 33 sums the output from the LUT 42 to the output from the LUT 44 to calculate the address Y0 shown by the equation (3-6).

The case where IBarnType is Cross is now explained.

In executing the fractionated movement effect (IBarnType=Cross), the LUTs (look-up tables) 41 to 44, ADAMX (Over) 31 and the ADAMY (Over) 33 of the read address generator 3 are used, as shown in FIG. 23.

In the LUTs 41 and 42 are set a function $f_1(y0)$, shown by the equation (3-10), and a function $f_2(x0)$, shown by the equation (3-11), are set, respectively. The LUTs 43 and 44 are set for multiplying an output from LUT 42 with $\cos_{,}$, and for multiplying an output from the LUT 42 with $\sin_{,,}$, respectively.

The ADAMX (Over) 31 multiplies an output from LUT 41 with $\cos_{,}$, and further sums an output from LUT 43 to calculate the address X0.

The ADAMY (Over) 33 multiplies an output from LUT 41 with $(-\sin_{,})$ and sums an output from LUT 44 to calculate the address Y0.

In this manner, the special picture effect device 1 uses the hardware, forming the read address generator 3, by a suitable combination, for converting the read address (x, y), entered to the read address generator 3, into the address (X, Y), used for outputting a picture corresponding to the picture which is stored in the frame buffer 2 and which has been subjected to the fractionated rotation effect.

4. Rupturing Effect

The rupturing effect is a special effect in which a picture is fractionated into two along a non-linear section line and the resulting pictures are moved along the x-axis to cause the background picture to appear as it is read out from the frame buffer 4, as shown in FIG. 24. By the rupturing effect, an effect like that in pulling and rupturing e.g. a paper sheet in the left-right direction may be obtained.

The shape of the section line in the rupturing effect may be afforded by the function F(x) shown in FIG. 25. The function F(x) may be generated by imparting the maximum amplitude, frequency and the phase by parameters fixAmplitude, fixFrequency and fixphase, shown in FIG. 26, generating random numbers [−1.0, 1.0] at a preset interval and by interpolating by a method conforming to the interpolation type (IInterpolationType).

Figure 27:
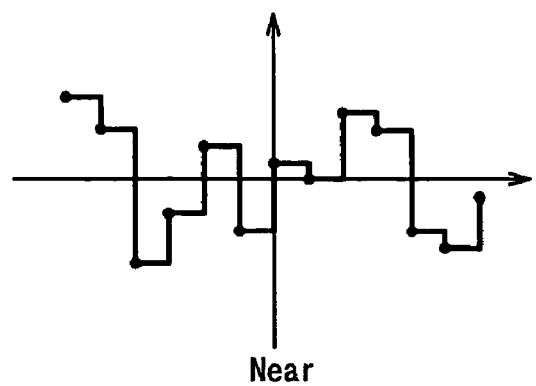
FIG. 27 shows the first interpolating method of a function creating a waveform.
Figure 28:
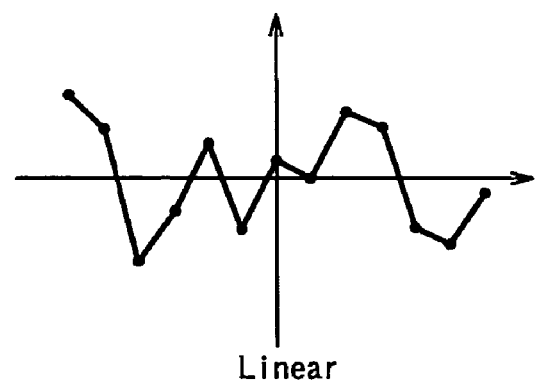
FIG. 28 shows the second interpolating method of a function creating a waveform.
Figure 29:
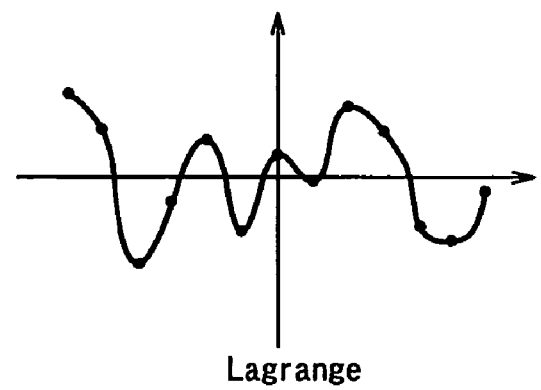
FIG. 29 shows the third interpolating method of a function creating a waveform.

FIGS. 27 to 29 show examples of the function F(x), generated by Near, Linear and Lagranger, having respective different interpolation types.

Figure 30:
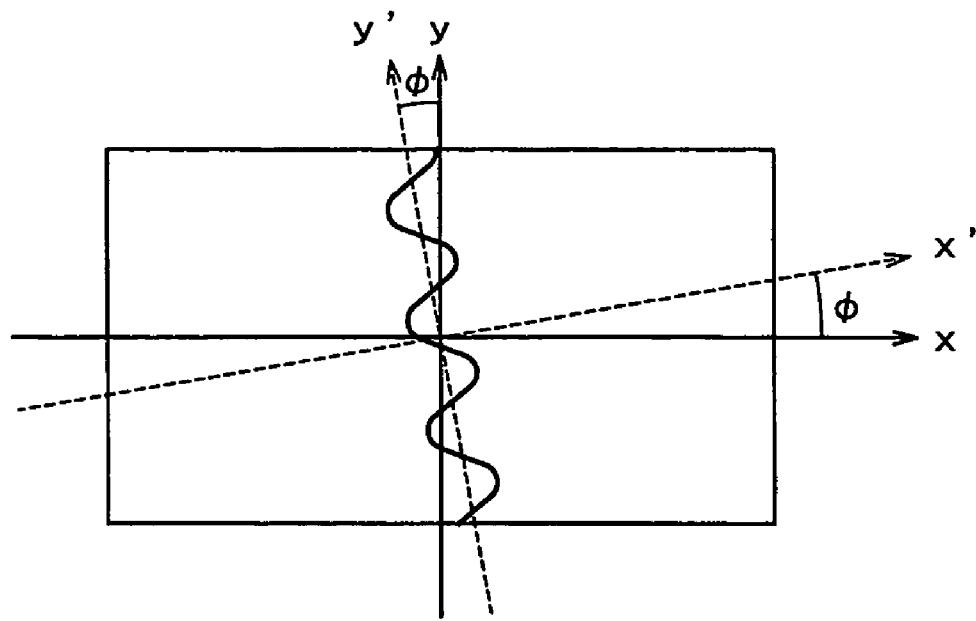
FIG. 30 illustrates a case where the coordinate axis is rotated in the rupturing effect.
Figure 31:
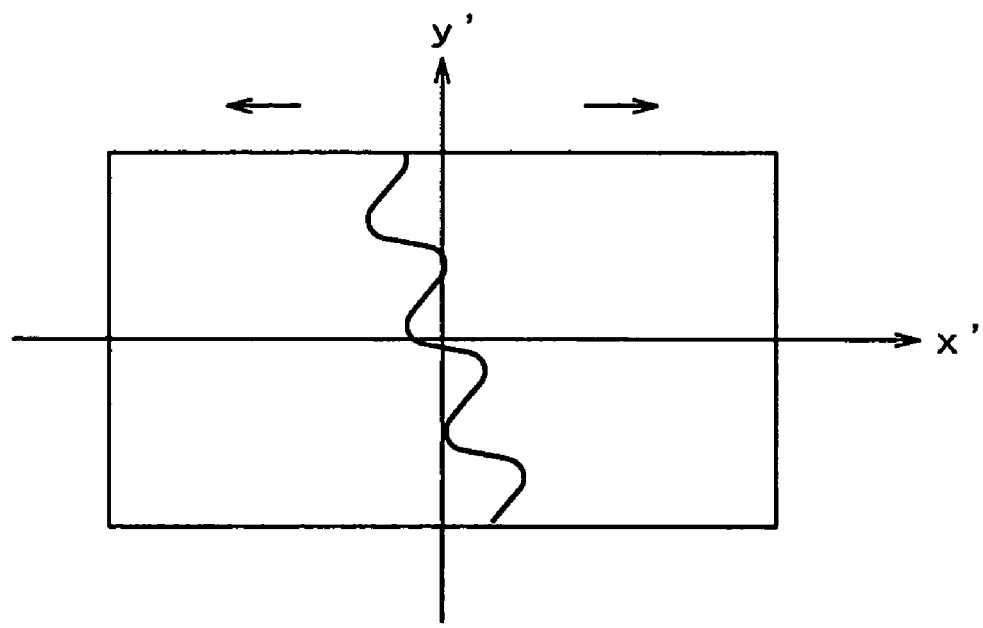
FIG. 31 shows a picture output when rotating the coordinate axis in the rupturing effect.

With the rupturing effect, the coordinate axes may be rotated through ,, for coordinate transformation, as shown in FIG. 30, for imparting the tilt to the waveform of the section line, as shown in FIG. 31.

Among other parameters to be supplied to the read address generator 3 is a parameter trans. This parameter trans is a parameter containing the time element which accords the quantity of movement of a picture to be rotated. If the parameter value is 0 or 1, the picture is not moved at all or disappears from the picture surface, respectively.

Specifically, the parameter trans is defined so that trans= (number of frames that took place as from the starting frame of the processing)/(total number of frames processed). For example, if it is desired to switch from the picture A to the picture B in e.g. a time of 30 frames, the values of trans=0/ 30, 1/30, 2/30, . . . , 29/30, 30/30 are received sequentially to carry out the processing on the frame basis.

When the sequential read address (x, y) is designated to the read address generator 3, the address (X, Y) of picture data read out from the frame buffer 2 is converted and found by the following process:

First, in finding the address (X, Y), associated with the read address (x, y), the coordinate system for the picture data stored in the frame buffer 2 has to be transformed into the coordinate system for calculations. To this end, the read address is converted to the address (x, y), using the equation (4-1):

$$x0 = x - cx$$

$$y0 = y - cy \qquad (4\text{-}1).$$

The coordinate system is then rotated by ,, , using the equation (4-2):

$$x1 = x0 \cos \phi + y0 \sin \phi$$

$$y1 = -x0 \sin \phi + y0 \cos \phi \qquad (4\text{-}2).$$

By rotating the address (x0, y0) by ,, , the address is converted to the address (x1, y1).

The picture then is fractionated in two, with the waveform defined by the function F(x) as a section line, and the resulting pictures are then moved along the x-axis, using the equation (4-3):

$$X1 = f_2(x1 - f_1(y1)) + f_1(y1)$$

$$Y1 = y1 \qquad (4\text{-}3).$$

The functions $f_1(y1)$ and $f_2(t)$ in the equation (4-3) are represented in the equations (4-4) and (4-5), respectively:

$$f_1(y1) = \text{fixAmplitude} \times F((y1 - \text{fixPhase}) \times \text{fixFreqency}) \qquad (4\text{-}4)$$

$$f_2(t) = \begin{cases} t + trans & (t \leq -trans) \\ \text{Max} & (-trans < t \leq trans) \\ t - trans & (trans < t) \end{cases} \qquad (4\text{-}5)$$

where $$t = x1 - f_1(y1).$$

In the equation (4-5), Max indicates that an address other than a picture that may be specified by the address (X0, Y0) is being specified. For example, if Max is specifying an address where there is stored a blue picture stored in the frame buffer 2, another picture may readily be synthesized to an area which has become Max, using the above picture as a key signal.

The function F(x), forming the waveform of the section line, is represented in the equation (4-4) as F((y1−fixphase)× fixFrequency).

The address (X1, Y1), thus calculated, is rotated through ,, in an opposite direction to that in the equation (4-2), using the equation (4-6):

$$X0 = X1 \cos \phi - Y1 \sin \phi$$

$$Y0 = X1 \sin \phi + Y1 \cos \phi \qquad (4\text{-}6).$$

Since the address (X0, Y0) is subjected to movement of the center position, the address (X, Y) is found, using the equation (4-7):

$$X = X0 + cx$$

$$Y = Y0 + cy \qquad (4\text{-}7).$$

In this manner, the read address generator 3 converts the read address (x, y) into the address (X, Y) of picture data stored in the frame buffer 2.

Figure 32:
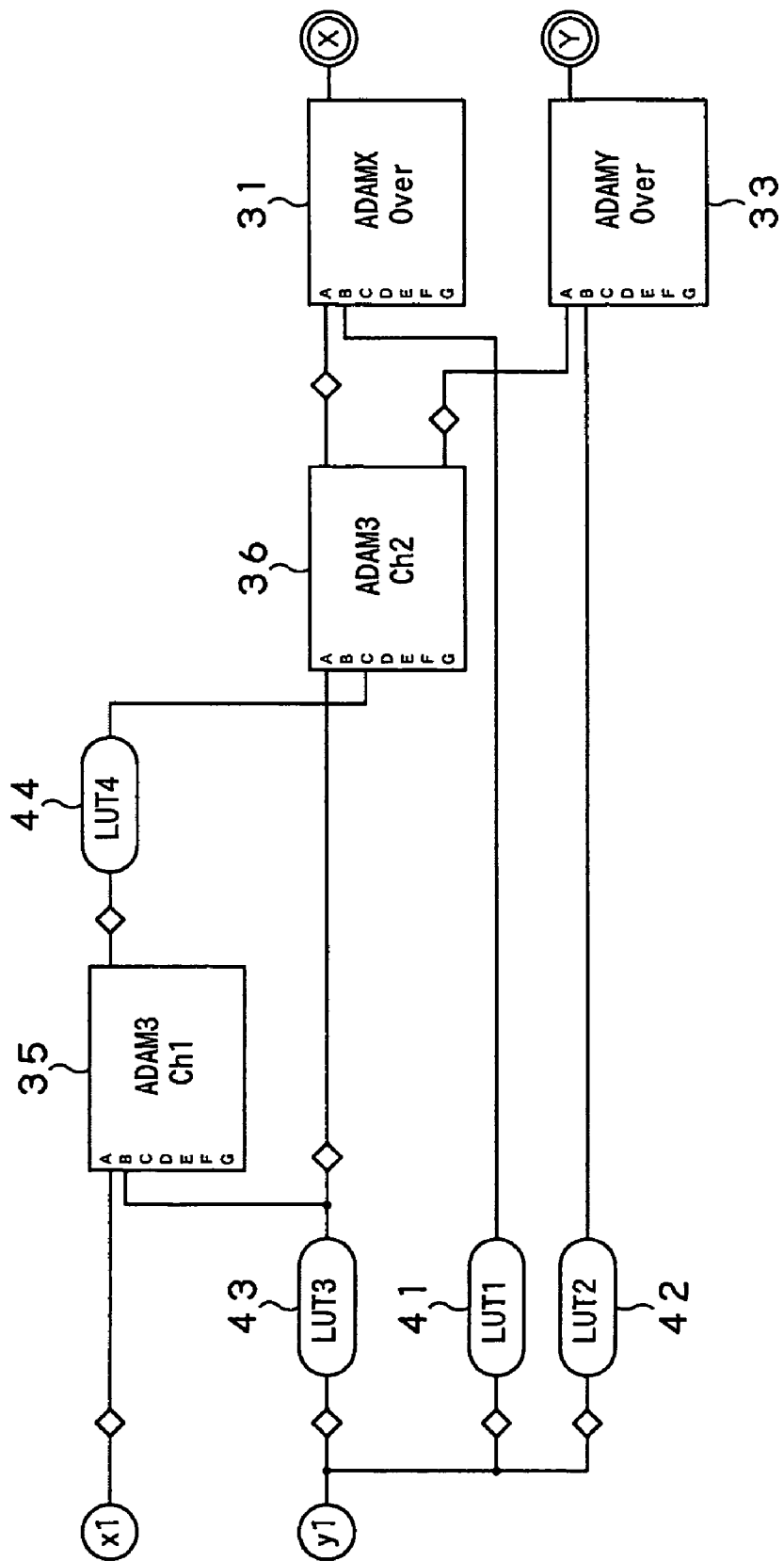
FIG. 32 illustrates the hardware structure of the read address generator for achieving the rupturing effect.

Referring to FIG. 32, the hardware structure of the read address generator 3 in case of executing the rupturing effect is explained.

The read address generator 3 includes plural modules, such as an adder-multiplier and a polar coordinate to rectangular coordinate converter, and executes the above calculations, based on the combination of these modules.

In carrying out the rupturing effect, the LUTs (look-up table) 41 to 44, the ADAMX (Over) 31, ADAMY (Over) 33, ADAM(Ch1) 35 and the ADAM(Ch2) 36 of the read address generator 3 are used.

The LUTs 41 to 44 are RAM (random access memory) tables, referred to by an address designated by cross-points indicated by diamond-shaped marks in the drawing. The data are set by a central processing unit (CPU), not shown. In the LUTs 41 to 44 are set a×sin,, , a×cos,, , a function f1(a) and a function f2(t), by a CPU (central processing unit), not shown, where a is a value entered to the LUTs 41, 42.

The ADAMX (Over) 31, ADAMX(Under) 32, ADAMY (Over) 33, ADAMX (Ch1) 35 and the ADAMY (Ch2) 36 are each provided with terminals A to G, and apply the calculations of (A+B)×(C+D)+E+F+G by addition and multiplication. For the terminals A to G, constant numbers or the cross-points indicated by diamond-shaped-marks in the drawing may be designated.

The operation of conversion from the read address (x, y) to the address (X, Y) by the above-described read address generator 3 is now explained. Meanwhile, the calculations shown in the equations (4-1) and (4-2) have been carried out by matrix calculations, by way of pre-processing, and the address (x1, y1), obtained on coordinate conversion, is supplied to the read address generator 3.

The ADAM(Ch1) 35 executes $t = X1 - f_1(y1)$ by the address x1 and an output from the LUT 43. This value is supplied by the LUT 44 to $f_2(t)$.

The ADAM(Ch2) 36 sums the output $f_1(y1)$ from the LUT 43 to the output $f_2(x1 - f_1(y1))$ to executer the equation (4-3) to calculate X1.

The ADAMX (Over) 31 multiplies X1, output from the ADAM(Ch2) 36, with cos,, , and subtracts y1×sin,, , output from the LUT 41, to execute the equation (4-6) to calculate the address X0. The ADAMX (Over) 31 sums cx to execute the equation (4-7) to calculate the address X.

The ADAMY (Over) 33 multiplies X1, output from the ADAM(Ch2) 36, with sin,, , and further sums y1×cos,, , output from the LUT 42, to execute the equation (4-6) to calculate the address Y0. The ADAMX (Over) 31 further sums cy to execute the equation (4-7) to calculate the address Y.

In this manner, the special picture effect device 1 uses the hardware, forming the read address generator 3, by a suitable combination, for converting the read address (x, y), entered to the read address generator 3, into the address (X, Y), used for outputting a picture corresponding to the picture which is stored in the frame buffer 2 and which has been subjected to the rupturing effect.

5. Rebound Effect

The rebound effect is such a special effect in which a new picture appears as if it jumps from outside the display area onto a background picture, read out from the frame buffer 4 and displayed, and in which the new picture is moved and inserted in a mid portion of the display area, as it bounces a preset number of times on the outer rim of the display area opposite to the side it first appeared, as shown in FIG. 33.

Referring to FIG. 34, the parameters entered to the read address generator 3 in the rebound effect are explained.

A parameter ICount sets the number of times of rebounding of the picture and may be from 1 to 10, with the default value thereof being 3.

A parameter fixPosition designates the descent position. If the value of the parameter fixPosition is −1.0, 1.0 and 0, the descent position is the left end, right end and the mid position of the picture, respectively. After rebounding the number of times as set by the ICount, the picture which has made the descent is moved to a mid position along the x-axis and halted thereat.

A parameter fixBound is the repulsive force, such that, if the value of the parameter is 0 or 1.0, the picture is not rebounded at all or is rebounded below the picture surface to disappear therefrom.

Among other parameters to be supplied to the read address generator 3 is a parameter trans. This parameter trans is a parameter containing the time element which accords the quantity of movement of a picture to be rotated. If the parameter value is 0 or 1, the picture is not moved at all or disappears from the picture surface, respectively.

Specifically, the parameter trans is defined so that trans=(number of frames that took place as from the starting frame of the processing)/(total number of frames processed). For example, if it is desired to switch from the picture A to the picture B in e.g. a time of 30 frames, the values of trans=0/30, 1/30, 2/30, . . . , 29/30, 30/30 are received sequentially to carry out the processing on the frame basis.

When the sequential read address (x, y) is designated to the read address generator 3, the address (X, Y) of picture data read out from the frame buffer 2 is converted and found by the following process:

In the rebound effect, the read address (x, y), entered to the read address generator 3, is converted into the address (X, Y), using the equation (5-1):

$$X = f_1(x)$$

$$Y = f_2(y) \tag{5-1}$$

Meanwhile, the functions f1(x) and f2(y) in the equation (5-1) may be represented by the equations (5-2) and (5-3), respectively:

$$f_1(x) = x + \text{trans} \times -\text{fixPosition} \times W \tag{5-2}$$

$$f_2(y) = \tag{5-3}$$

$$\begin{cases} y - H(t_0^2 - t^2) & (0 \le t \le t_0) \\ y - H(t_1^2 - (t_0 + t_1 - t)^2) & (t_0 \le t < t_0 + 2t_1) \\ y - H(t_2^2 - (t_0 + 2t_1 + t_2 - t)^2) & (t_0 + 2t_1 \le t < t_0 + 2t_1 + 2t_2) \\ \qquad M \\ y - H\left(t_N^2 - \left(t_0 + \sum_{i=1}^{N-1} 2t_i + t_N - t\right)^2\right) & \left(t_0 + \sum_{i=1}^{N-1} 2t_i \le t \le 1\right) \end{cases}$$

where
W=picture width
N=ICount
α=fixRebound
$t_i = \alpha^{i-1}$ $$T = t_0 + \sum_{i=1}^{N} 2t_i$$

t=T×trans
H=picture height

It is seen from the equation (5-2) that, if fixPosition is of a negative value, such as −1.0, the picture is moved along the x-axis in the positive direction, whereas, if it is of a positive value, such as 1.0, the picture is moved along the x-axis in the negative direction. It is also seen that, if fixPosition is 0, the read address is converted into the address X, such that the picture is not moved at all.

Figure 36:
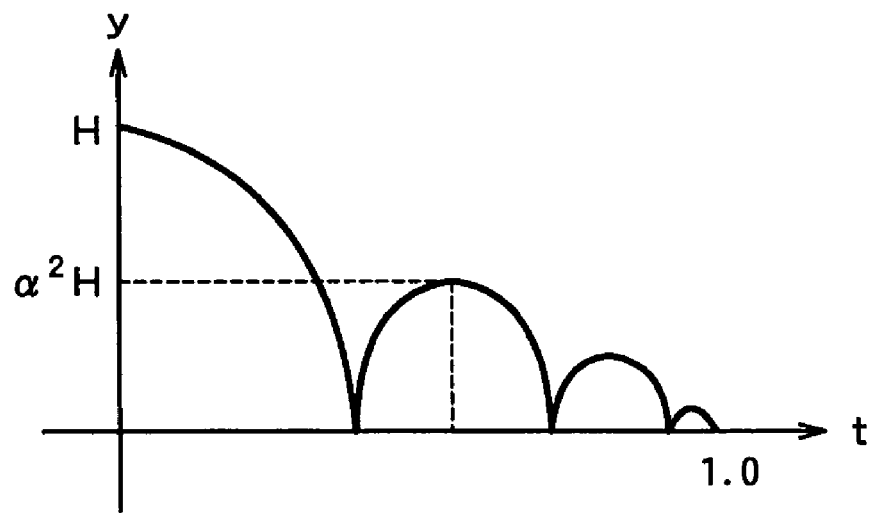
FIG. 36 shows the transition of a function $f_2(y)$ in the rebound effect.
Figure 37:
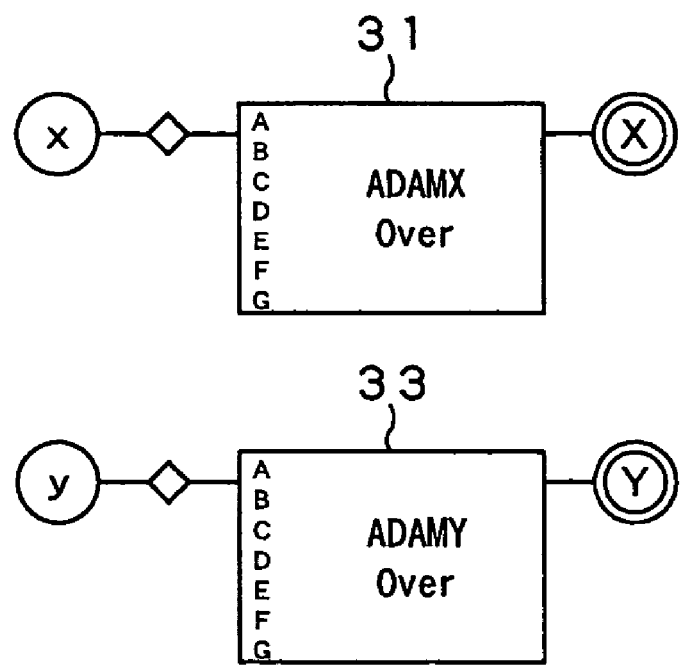
FIG. 37 shows the hardware structure of the read address generator for achieving the rebound effect.

The equation (5-3) shows the height position of the rebounding picture. FIG. 36 specifically shows the trajectory by the equation (5-3). This figure shows the trajectory of the equation (5-3) when the parameter ICount for the number of times of the rebounding is of the default value of 3, the parameter fixRebound, which accords the recoiling force, is of the default value of 0.5. It is seen that the picture which has made a descent from a height H is rebounded thrice, as the height is halved each time it is rebounded.

In this manner, the read address generator 3 converts the read address (x, y) into the address (X, Y) of the picture data stored in the frame buffer 2.

Then, referring to FIG. 137, the hardware structure of the read address generator 3 in case of carrying out the fractionated rotation effect is explained.

The read address generator 3 includes plural modules, such as an adder-multiplier and a polar coordinate to rectangular coordinate converter, and executes the above calculations, based on the combination of these modules.

In carrying out the rebounding effect, the ADAMX (Over) 31 and the ADAMY (Over) 33 of the read address generator 3 are used, as shown in FIG. 137.

The ADAMX (Over) 31 and the ADAMY (Over) 33 are each provided with terminals A to G, and apply the calculations of (A+B)×(C+D)+E+F+G by addition and multiplication. For the terminals A to G, constant numbers or the cross-points indicated by diamond-shaped marks in the drawing may be designated.

The operation of conversion from the read address (x, y) to the address (X, Y) by the above-described read address generator 3 is now explained.

The ADAMX (Over) 31 sums a constant shown by the equation (5-2) to the input address x to calculate the address X.

The ADAMX (Over) 33 sums a constant shown by the equation (5-3) to the input address y to calculate the address Y In this manner, the special picture effect device 1 uses the hardware, forming the read address generator 3, by a suitable combination, for converting the read address (x, y), entered to the read address generator 3, into the address (X, Y), used for outputting a picture corresponding to the picture which is stored in the frame buffer 2 and which has been subjected to the rotation effect.

What is claimed is:

1. A special effect device in which picture signals are read out from a frame buffer based on an address signal to impart a desired special effect to the picture signals read out from said frame buffer, said special effect device comprising:
    address signal generating means for generating readout address signals of said picture signals stored in said frame buffer so that a special effect will be produced in which a picture corresponding to the picture signals stored in said frame buffer is fractionated into plural partial pictures, having a wavy boundary line, defined by a preset function F, at the time of display, said partial pictures being translated so as to disappear to outside the display area, wherein said preset function F is defined as:

$$F(x)=F((y1-\text{fixPhase})\times\text{fixFrequency})$$

wherein said address signal generating means generates, for a case in which, with the amount of movement trans, said preset function F, the maximum amplitude of the waveform produced by said function F fixAmplitude, the frequency fixFrequency and with the phase fixPhase, the center of a picture corresponding to the picture signals stored in said frame buffer is at the point of origin of a rectangular coordinate system, the readout address signal (X1, Y1) of said picture signals, translating plural partial pictures as fractionated by said wavy boundary line defined by said preset function F, so that the partial pictures are caused to disappear to outside the display area, by the equation (4-3):

$$X1=f_2(x1-f_1(y1))+f_1(y1)$$

$$Y1=y1 \qquad (4\text{-}3)$$

which satisfies the equations (4-4) and (4-5):

$$f_1(y1)=\text{fixAmplitude}\times F((y1-\text{fixPhase})\times\text{fixFreqency}) \qquad (4\text{-}4)$$

$$f_2(t) = \begin{cases} t+trans & (t \le -trans) \\ \text{Max} & (-trans < t \le trans) \\ t-trans & (trans < t) \end{cases} \qquad (4\text{-}5)$$

where $$t=x1-f_1(y1)$$

said address signal generating means further comprising means for generating the readout address signal (X0, Y0) on rotation of the rectangular coordinate axis by $\phi$ by the equation (4-6):

$$X0=X1 \cos \phi - Y1 \sin \phi$$

$$Y0=X1 \sin \phi Y1 \cos \phi \qquad (4\text{-}6)$$

said address signal generating means further generating the readout address signal (X, Y), for a case where the position of the point of origin in the rectangular coordinate system of a picture corresponding to picture signals stored in said frame buffer, by the equation (4-7):

$$X=X0+cx$$

$$Y=Y0+cy \qquad (4\text{-}7)$$

where, in the equation (4-5), Max denotes generation of a readout address signal for reading out a signal other than said picture signals stored in said frame buffer.

2. An address signal generating device for generating an address signal for reading out picture signals from a frame buffer, said address signal generating device including:

address signal generating means for generating a readout address signal of said picture signals stored in said frame buffer so that a special effect will be produced in which a picture corresponding to the picture signals stored in said frame buffer is fractionated into plural partial pictures having a wavy boundary line as defined by a preset function F at the time of display and in which each partial picture is translated to disappear to outside the display area, wherein said preset function F is defined as:

$$F(x)=F((y1-\text{fixPhase})\times\text{fixFrequency})$$

wherein said address signal generating means generates, for a case in which, with the amount of movement trans, said preset function F, the maximum amplitude of the waveform produced by said function F fixAmplitude, the frequency fixFrequency and with the phase fixPhase, the center of a picture corresponding to the picture signals stored in said frame buffer is at the point of origin of a rectangular coordinate system, the readout address signal (X1, Y1) of said picture signals, translating plural partial pictures as fractionated by said wavy boundary line defined by said preset function F, so that the partial pictures are caused to disappear to outside the display area, by the equation (4-3):

$$X1=f_2(x1-f_1(y1))+f_1(y1)$$

$$Y1=y1 \qquad (4\text{-}3)$$

which satisfies the equations (4-4) and (4-5):

$$f_1(y1)=\text{fixAmplitude}\times F((y1-\text{fixPhase})\times\text{fixFreqency}) \qquad (4\text{-}4)$$

$$f_2(t) = \begin{cases} t+trans & (t \le -trans) \\ \text{Max} & (-trans < t \le trans) \\ t-trans & (trans < t) \end{cases} \qquad (4\text{-}5)$$

where $$t=x1-f_1(y1)$$

said address signal generating means further comprising means for generating the readout address signal (X0, Y0) on rotation of the rectangular coordinate axis by $\phi$ by the equation (4-6):

$$X0=X1 \cos \phi - Y1 \sin \phi$$

$$Y0=X1 \sin \phi + Y1 \cos \phi (4\text{-}6)$$

said address signal generating means further generating the readout address signal (X, Y), for a case where the position of the point of origin in the rectangular coordinate system of a picture corresponding to picture signals stored in said frame buffer, by the equation (4-7):

$$X=X0+cx$$

$$Y=Y0+cy \qquad (4\text{-}7)$$

where, in the equation (4-5), Max denotes generation of a readout address signal for reading out a signal other than said picture signals stored in said frame buffer.

3. An address signal generating method for generating an address signal for reading out picture signals from a frame buffer, said address signal generating method including:

an address signal generating step of generating a readout address signal of said picture signals stored in said frame buffer so that a special effect will be produced in which a picture corresponding to the picture signals stored in said frame buffer is fractionated into plural partial pictures having a wavy boundary line as defined by a preset function F at the time of display and in which each partial picture is translated to disappear to outside the display area,
wherein said preset function F is defined as:

$$F(x)=F((y1-\text{fixPhase})\times\text{fixFrequency})$$

wherein said address signal generating step generates, for a case in which, with the amount of movement trans, said preset function F, the maximum amplitude of the waveform produced by said function F fixAmplitude, the frequency fixFrequency and with the phase fixPhase, the center of a picture corresponding to the picture signals stored in said frame buffer is at the point of origin of a rectangular coordinate system, the readout address signal (X1, Y1) of said picture signals, translating plural partial pictures as fractionated by said wavy boundary line defined by said preset function F, so that the partial pictures are caused to disappear to outside the display area, by the equation (4-3):

$$X1=f_2(x1-f_1(y1))+f_1(y1)$$

$$Y1=y1 \quad (4\text{-}3)$$

which satisfies the equations (4-4) and (4-5):

$$f_1(y1)=\text{fixAmplitude}\times F((y1-\text{fixPhase})\times\text{fixFreqency}) \quad (4\text{-}4)$$

$$f_2(t)\begin{cases} t + trans & (t \leq -trans) \\ \text{Max} & (trans < t \leq trans) \\ t - trans & (trans < t) \end{cases} \quad (4\text{-}5)$$

where $$t=x1-f_1(y1)$$

said address signal generating step further generating the readout address signal (X0, Y0) on rotation of the rectangular coordinate axis by φ by the equation (4-6):

$$X0=X1\cos\phi - Y1\sin\phi$$

$$Y0=X1\sin\phi + Y1\cos\phi \quad (4\text{-}6)$$

said address signal generating step further generating the readout address signal (X, Y), for a case where the position of the point of origin in the rectangular coordinate system of a picture corresponding to picture signals stored in said frame buffer, by the equation (4-7):

$$X=X0+cx$$

$$Y=Y0+cy \quad (4\text{-}7)$$

where, in the equation (4-5), Max denotes generation of a readout address signal for reading out a signal other than said picture signals stored in said frame buffer; and displaying a picture signal corresponding to the readout address signal.

4. A computer-readable medium storing an address signal generating program for generating an address signal for reading out picture signals from a frame buffer, said address signal generating program executing:

an address signal generating step of generating a readout address signal of said picture signals stored in said frame buffer so that a special effect will be produced in which a picture corresponding to the picture signals stored in said frame buffer is fractionated into plural partial pictures having a wavy boundary line as defined by a preset function F at the time of display and in which each partial picture is translated to disappear to outside the display area,
wherein said preset function F is defined as:

$$F(x)=F((y1-\text{fixPhase})\times\text{fixFrequency})$$

wherein said address signal generating step generates, for a case in which, with the amount of movement trans, said preset function F, the maximum amplitude of the waveform $$X1=f_2(x1-f_1(y1))+f_1(y1)$$
$$Y1=y1$$

produced by said function F fixAmplitude, the frequency fixFrequency and with the phase fixPhase, the center of a picture corresponding to the picture signals stored in said frame buffer is at the point of origin of a rectangular coordinate system, the readout address signal (X1, Y1) of said picture signals, translating plural partial pictures as fractionated by said wavy boundary line defined by said preset function F, so that the partial pictures are caused to disappear to outside the display area, by the equation (4-3):
which satisfies the equations (4-4) and (4-5):

$$f_1(y1)=\text{fixAmplitude}\times F((y1-\text{fixPhase})\times\text{fixFreqency}) \quad (4\text{-}4)$$

$$f_2(t)\begin{cases} t + trans & (t \leq -trans) \\ \text{Max} & (trans < t \leq trans) \\ t - trans & (trans < t) \end{cases} \quad (4\text{-}5)$$

where $$t=x1-f_1(y1)$$

said address signal generating step further generating the readout address signal (X0, Y0) on rotation of the rectangular coordinate axis by φ by the equation (4-6):

$$X0=X1\cos\phi - Y1\sin\phi$$

$$Y0=X1\sin\phi + Y1\cos\phi \quad (4\text{-}6)$$

said address signal generating step further comprising means for generating the readout address signal (X, Y), for a case where the position of the point of origin in the rectangular coordinate system of a picture corresponding to picture signals stored in said frame buffer, by the equation (4-7):

$$X=X0+cx$$

$$Y=Y0+cy \quad (4\text{-}7)$$

where, in the equation (4-5), Max denotes generation of a readout address signal for reading out a signal other than said picture signals stored in said frame buffer.

* * * * *